(12) United States Patent
Bunai

(10) Patent No.: US 10,054,468 B2
(45) Date of Patent: Aug. 21, 2018

(54) CHROMAULIC DISPLACEMENT TRANSDUCER, METHOD OF MANUFACTURING A CHROMAULIC DISPLACEMENT TRANSDUCER, AND CLOSED LOOP CONTROL SYSTEM INCORPORATING THE SAME

(71) Applicant: Stress Indicators, Inc., Gaithersburg, MD (US)

(72) Inventor: Christopher Bunai, Frederick, MD (US)

(73) Assignee: Stress Indicators, Inc., Gaithersburg, MD (US)

( * ) Notice: Subject to any disclaimer, the term of this patent is extended or adjusted under 35 U.S.C. 154(b) by 0 days.

(21) Appl. No.: 15/677,953

(22) Filed: Aug. 15, 2017

(65) Prior Publication Data
US 2018/0045539 A1    Feb. 15, 2018

Related U.S. Application Data

(60) Provisional application No. 62/375,000, filed on Aug. 15, 2016.

(51) Int. Cl.
| | |
|---|---|
| *G01B 11/00* | (2006.01) |
| *G01D 5/00* | (2006.01) |
| *G01D 5/353* | (2006.01) |
| *G01D 5/26* | (2006.01) |
| *G01D 5/34* | (2006.01) |
| *G01B 11/16* | (2006.01) |

(52) U.S. Cl.
CPC ............ *G01D 5/353* (2013.01); *G01D 5/268* (2013.01); *G01D 5/34* (2013.01); *G01B 11/16* (2013.01)

(58) Field of Classification Search
None
See application file for complete search history.

(56) References Cited

U.S. PATENT DOCUMENTS

| | | | |
|---|---|---|---|
| 2,600,029 A | 6/1952 | Stone | |
| 2,747,454 A | 5/1956 | Bowersett | |
| 3,082,742 A * | 3/1963 | Vilmerding | ........... B25B 23/145 |
| | | | 173/178 |
| 3,194,105 A | 7/1965 | Gill | |
| 3,224,316 A | 12/1965 | Grikscheit | |
| 3,248,923 A | 5/1966 | Blakeley | |
| 3,602,186 A * | 8/1971 | Popenoe | ................. F16B 31/02 |
| | | | 411/13 |
| 3,799,108 A * | 3/1974 | Mosow | .................... F16B 31/02 |
| | | | 116/212 |
| 3,850,133 A * | 11/1974 | Johnson | .................. F16B 31/02 |
| | | | 116/212 |
| 3,964,299 A * | 6/1976 | Johnson | ................ F16B 31/025 |
| | | | 116/212 |

(Continued)

*Primary Examiner* — Shawn Decenzo
*Assistant Examiner* — Jarreas C Underwood
(74) *Attorney, Agent, or Firm* — Dickinson Wright, PLLC

(57) ABSTRACT

Described herein is an improved displacement transducer, a closed loop control system incorporating the same, and an improved method of manufacturing of manufacturing a displacement transducer. The improved transducer has several advantages, including improved manufacturability; improved fluid flow within the sensor and reduced cavitation as a result; and the enablement of closed loop control for assisted manual or fully automatic displacement.

25 Claims, 23 Drawing Sheets

(56) References Cited

U.S. PATENT DOCUMENTS

| | | | |
|---|---|---|---|
| 3,987,668 A | | 10/1976 | Popenoe |
| 3,987,699 A | * | 10/1976 | Popenoe ............... F16B 31/025 116/DIG. 34 |
| 4,002,139 A | * | 1/1977 | Payne .................... G01B 5/30 116/212 |
| 4,114,428 A | | 9/1978 | Popenoe |
| 4,686,859 A | | 8/1987 | Wallace |
| 4,793,751 A | * | 12/1988 | Takeuchi ............. F16B 31/025 411/13 |
| 4,904,132 A | | 2/1990 | Popenoe |
| 5,189,979 A | | 3/1993 | Popenoe |
| 5,376,785 A | * | 12/1994 | Chin ...................... G01D 5/30 250/214 PR |
| 5,402,508 A | | 3/1995 | O'Rourke et al. |
| 5,668,323 A | | 9/1997 | Waxman |
| 6,784,799 B2 | | 8/2004 | Hsien |
| 7,412,898 B1 | * | 8/2008 | Smith .................... G01L 5/24 73/761 |
| 7,958,614 B2 | | 6/2011 | Popenoe |
| 8,448,520 B1 | | 5/2013 | Mekid et al. |
| 8,521,448 B1 | | 8/2013 | Ung et al. |
| 8,540,468 B2 | | 9/2013 | Mekid et al. |
| 8,893,557 B2 | | 11/2014 | Mekid et al. |
| 8,978,967 B2 | * | 3/2015 | Gamboa ............ G05B 19/4183 235/375 |
| 9,483,674 B1 | | 11/2016 | Fink et al. |
| 9,677,593 B2 | * | 6/2017 | Hsieh .................... F16B 31/02 |
| 2009/0092457 A1 | | 4/2009 | Popenoe |
| 2010/0222827 A1 | | 9/2010 | Griffiths et al. |
| 2012/0013471 A1 | | 1/2012 | Jones |

* cited by examiner

Detail D

Detail A

Section A-A

Detail A

CHROMAULIC DISPLACEMENT TRANSDUCER, METHOD OF MANUFACTURING A CHROMAULIC DISPLACEMENT TRANSDUCER, AND CLOSED LOOP CONTROL SYSTEM INCORPORATING THE SAME

CROSS REFERENCE TO RELATED APPLICATIONS

The present invention claims the benefit under 35 U.S.C. § 119(e) of provisional patent application No. 62/375,000 filed Aug. 15, 2016, the entire contents of which are incorporated herein by reference.

BACKGROUND OF THE INVENTION

This application relates to displacement or strain indicators, and more particularly to fluid based opti-mechanical indicators capable of indicating very small displacements or movements of one member relative to another member via a change in intensity or color of an indicator.

There have been a number of attempts to create a low cost, easy to use displacement indicator. For example, U.S. Pat. No. 3,602,186 to Popenoe, which is incorporated herein by reference in its entirety, introduced the concept of using a preferably dark fluid within a mechanical device to create a significant color change when there was relative motion between two portions of the device. In two subsequent patents, U.S. Pat. No. 3,799,108 to Mosow and U.S. Pat. No. 3,850,133 to Johnson, difficulty of manufacture was stated as motivation for the sub-assembly module designs that were described. Another advance in manufacturability is described in U.S. Pat. No. 3,987,699 to Popenoe, which is hereby incorporated by reference in its entirety. The '699 patent described a self-contained flexible container encapsulating the indicator fluid, which is known as a microindicator.

Further patents describe additional developments in microindicators, including U.S. Pat. Nos. 3,987,668, 4,904, 132, 5,189,979, and 7,958,614, each to Popenoe, and each of which being incorporated herein by reference in their entirety. One form of displacement microindicator technology was configured for use as a tension indicating fastener. A very common problem when installing a bolt is controlling the amount of "preload" or tension on the fastener. Since it has been historically difficult to measure the tension directly, industry has relied on the use of torque wrenches as a means to control tension. Unfortunately, due to the inherent variability of the torque-tension relationship, any method using measurement of torque to control tension has resulted in intrinsically inaccurate tension results. These inaccuracies and problems remain in industry today.

Manufacturability of the indicator described in the '186 patent has been difficult to improve, and there have been ongoing efforts to make the indicators more efficiently. Two subsequent patents, U.S. Pat. No. 3,799,108 to Mosow and U.S. Pat. No. 3,850,133 to Johnson each describes a "module" design that was able to be manufactured in larger numbers, yet, performance of these designs were unacceptable due to a tendency of the designs to leak fluid, especially over time, resulting in non-operable products. The displacement microindicator technology described by Popenoe in the '699 patent, however, was able to improve upon the leaking design and provide a successful and usable displacement indicator product. Although the microindicator described in the '699 patent improved manufacturability, the microindicator technology utilized polymer based materials that limit application in temperature environments greater than 75° C.

SUMMARY OF THE INVENTION

The above described problems are overcome, and other advantages realized, by the embodiments of the invention described herein. The invention exemplified by the embodiments in this patent application is a significant advance over all previously created fluid based opti-mechanical strain indicators. The embodiments shown offer improvements to the current state of the art in performance, cost, manufacturability, and user ease.

Over 450,000 smart fasteners based on the microindicator described in the '699 patent have been manufactured. The Opti-Hydraulic Embedded Displacement Transducer improves upon those prior devices in several respects. Color based visual indication remains desirable but variable lighting conditions, subjective user perception, obscuring installation tools, and inaccessibility create a need for more objective measurement of the visual indicator. Certain embodiments of the invention described herein provide dual operability of a visual indicator that can be read by an end user's eye or electronic device utilizing fiber optic or other visual means. The compatibility of this indicator with fiber optic sensing devices expands application from not only a visual indicator of displacement but also as an optical transducer of displacement. In the most general sense, this new opti-hydraulic technology can be described as Chromaulic which is the conjunction of the Greek "Chroma" meaning color and "aulic" meaning pipe in relation to hydraulics. Therefore, Chromaulic Sensors shall refer to embedded light absorbing fluids utilized in optical sensing applications of displacement.

To assist in the optical sensing, a fiber optic sensor is preferably comprised of the compatible fiber optic probe and an electronic circuit. The junction of a Chromaulic Sensor with a fiber optic sensor enables the creation of a Chromaulic Displacement Transducer. The combination of this Chromaulic Displacement Transducer with an Electromechanical system capable of inducing displacement of a mechanical body allows the conception of a very useful closed loop displacement control system.

Since a common embodiment of this invention is a threaded fastener, the Chromaulic Sensor can take the form of a Smart Bolt. The fiber optic sensor can be integrated into a wrench that can measure the tension directly although those of ordinary skill in the art will appreciate that the fiber optic sensor may be integrated into any suitable device, and is not limited to a wrench. This "Tension Wrench" can measure the tension developed within the fastener by measuring the light intensity change caused by the Chromaulic Sensor. The Chromaulic Transducer system in a simple form would consist of a controlled light source of stable intensity transmitted through a transmitter fiber normal to the embedded Chromaulic Sensor. One or more receiver fibers capture the reflected light and feedback the attenuated light signal that is proportional to the fluid thickness and thus the fastener's tension level. The reflected light signal is then converted to a voltage by a photoelectric device. The voltage can then be utilized by the control system to drive the electromechanical system. That is, a control system according to an embodiment of the invention can drive a threaded fastener, or the like, to a set tension. An advantage of this design is that it is a closed loop control system which is able to adequately compensate for unanticipated disturbances that frequently create serious problems for open loop systems.

Additional benefits that the illustrated embodiments can offer are relative incompressibility, significantly improved robustness, higher temperature performance, and expanded performance capability in general. Improved manufacturability has been a focus during the design of the Chromaulic Sensor and will be discussed. Another improvement over previous designs is the solution to fluid cavitation during tightening.

The Chromaulic Sensor has a few aspects in its design that contribute to these advantages. One advantage is the ability to be assembled in multiple stages. This ability makes it practical for the first time to fill the sensor with fluid after a percentage of the assembly has already been completed using the fluid filling channels. A second advantage is that once the sensor is filled, it is able to be effectively and permanently sealed using a curable material such as an epoxy. Since the curable material is initially liquid, it is able to seal and bond all of the potentially imperfect surfaces that would otherwise result in leaking. A curable material such as epoxy is able to encapsulate the nearly completely filled design creating a virtually incompressible and embedded displacement sensor. A third advantage of the design is in the use of special geometries and materials like porous metals or ported ceramics that are able to beneficially alter the flow characteristics of the fluid within the sensor compared to existing devices. As the technology is increasingly embedded, many of the components can be considered composite materials. A fourth advantage is since the design has removed insufficiently temperature resistant polymers, the operating performance of the Chromaulic Sensor has been improved. A fifth advantage is the differential thermal expansion has also been improved through material selection combined with composite interfaces which improves the accuracy of the sensor over a wider range of temperatures. A sixth novel feature is the use of closed cell foam to smooth pressure differentials acting as a self-contained Air Chamber. The use of a closed cell foam within the sealed sensor advantageously absorbs fluid expansion pressures as well as assisting against low pressure cavitation. Resistance to low pressure cavitation is more predominantly addressed with the porous or ported gage pin 14 that changes the fluid flow dynamics of actuation.

BRIEF DESCRIPTION OF THE DRAWINGS

Exemplary embodiments will be understood with reference to the attached drawing figures in which.

Throughout the drawings, like reference numbers should be understood to refer to like elements, features and structures.

DETAILED DESCRIPTION OF EXEMPLARY EMBODIMENTS

Figure 1:
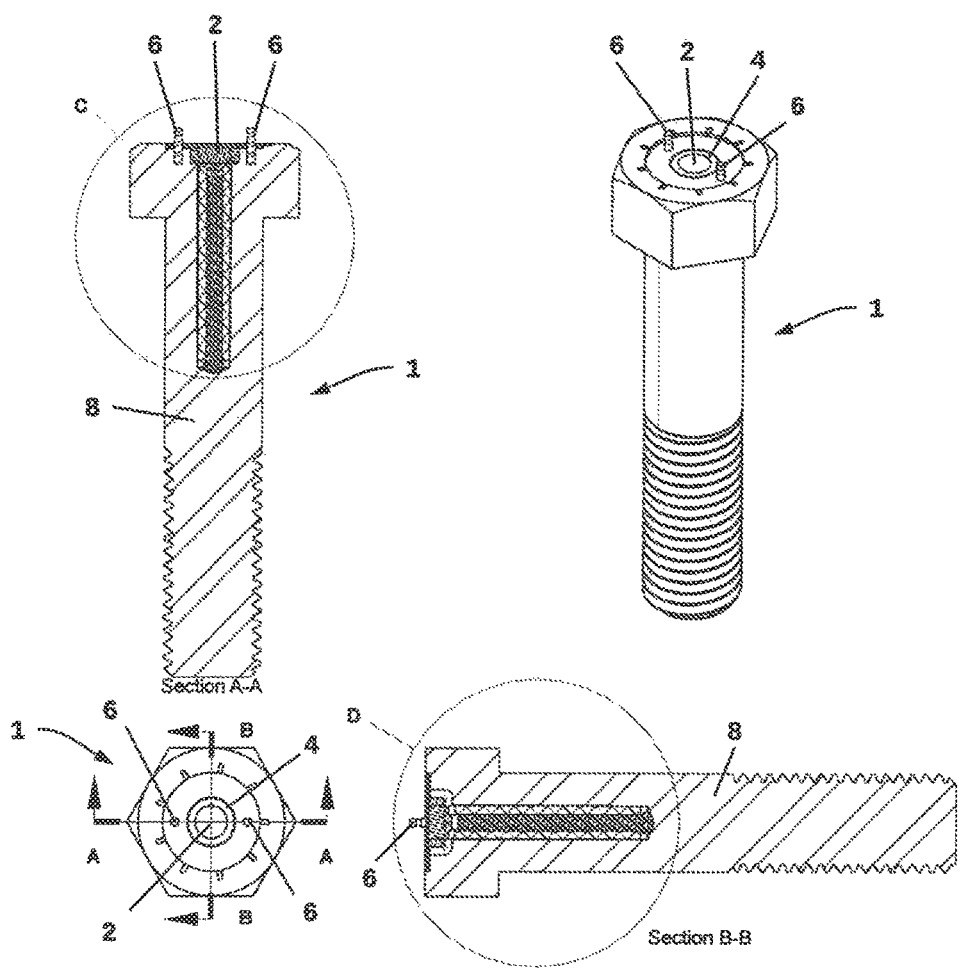
FIG. 1 includes isometric, top and cross-sectional views of an Opti-Hydraulic Embedded Displacement Transducer according to a first embodiment of the invention.
Figure 2:
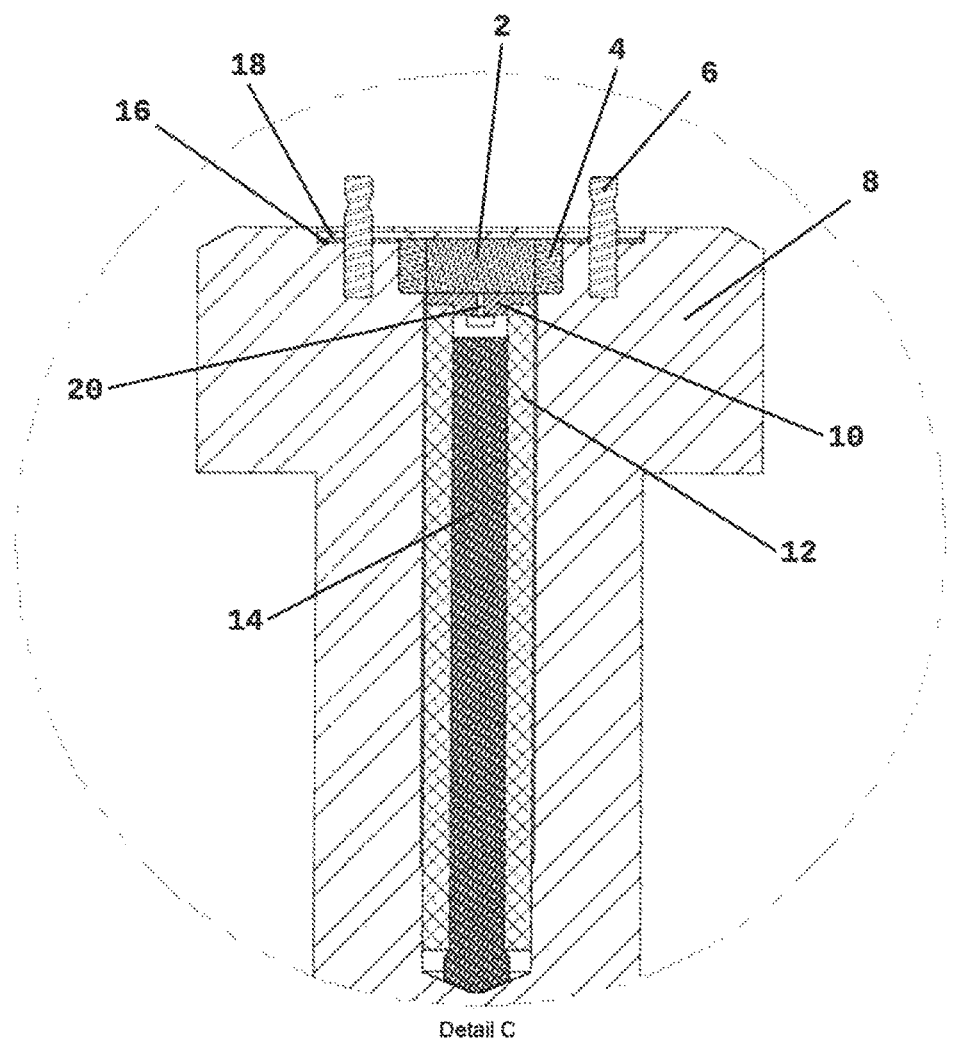
FIG. 2 is a detail view of Section A-A of the Opti-Hydraulic Embedded Displacement Transducer of FIG. 1.
Figure 3:
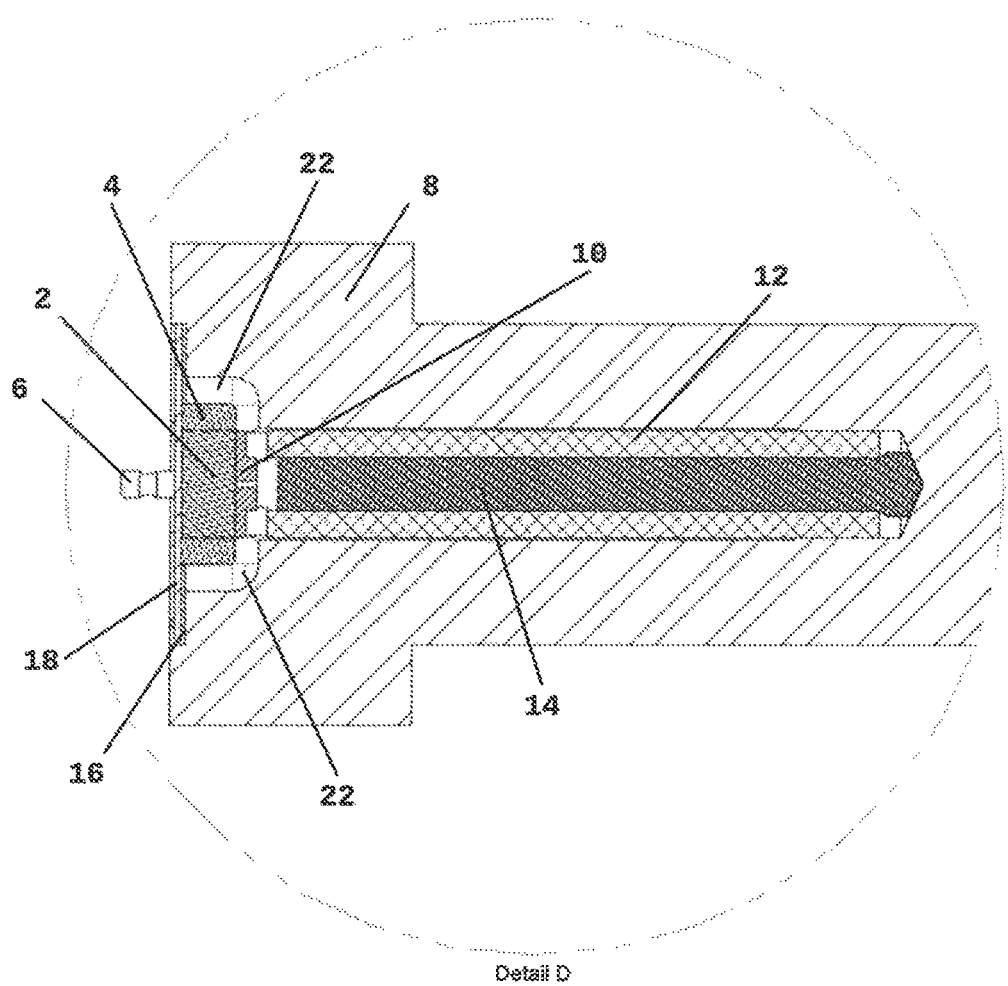
FIG. 3 is a detail view of Section B-B of the Opti-Hydraulic Embedded Displacement Transducer of FIG. 1.

A first exemplary embodiment of the invention is shown in FIGS. 1-3. The first embodiment is in the form of a threaded fastener 1 with incorporated tension indicator, which shall be referred to as an Opti-Hydraulic Transducer or Chromaulic Sensor. FIG. 1 includes isometric, top and two cross-sectional views taken along sections A-A and B-B as indicated in the top view. FIG. 2 is a detail view of Section C of FIG. 1, and FIG. 3 is a detail view of Section D of FIG. 1. The isometric view in FIG. 1 illustrates the central window 2 and window ring 4, enable the viewer to see the tension or "strain" level of the fastener 1 as well as a pair of locating pins 6.

As better illustrated in FIG. 2 transparent datum window 2 is mounted in window ring 4, which is retained within fastener body 8. The transparent datum window 2 abuts gage pin indicator slab 10. Gage pin indicator slab 10 is preferably permanently bonded to hollow gage pin wall slotted 12 which is bonded and fixed to fastener body 8 at the opposing distal end within a central bore of the fastener body 8. The gage pin indicator slab 10 is preferably made of an impermeable, non-staining material like ceramic. Closed cell elastomeric foam cylinder 14 is retained within hollow gage pin wall slotted 12. The data shield 16 is located around window ring 4, fastener body 8, and locating pins 6. Window ring 4, transparent datum window 2, data shield 16, and the base of the locating detent pins 6 are all encapsulated by transparent epoxy layer 18. Only the top of locating pins 6 pass through epoxy layer 18. In this embodiment, gage pin indicator slab is provided with a small port 20 on center. As best illustrated in FIG. 3 fluid filling channels 22 are provided. The fluid filling channels 22 provide the conduit for the light sensitive fluid to nearly fill the entire internal reservoir before final sealing operations close the channel.

Figure 4:
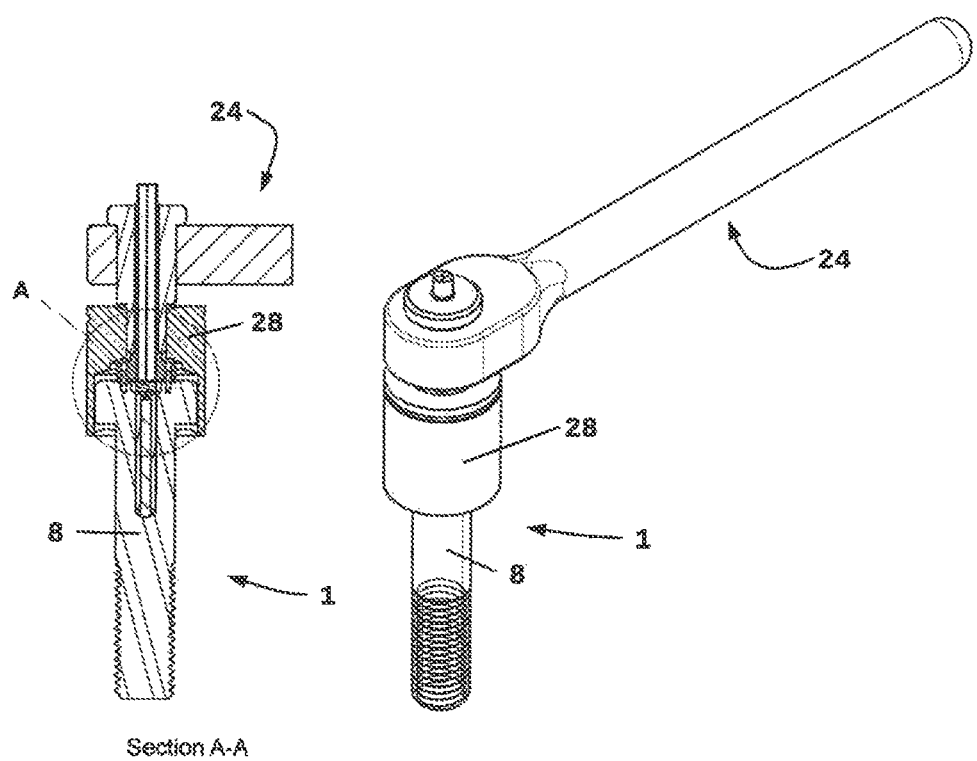
FIG. 4 includes isometric and cross-sectional views of a tension wrench in use with the embodiment illustrated in FIGS. 1-3.
Figure 5:
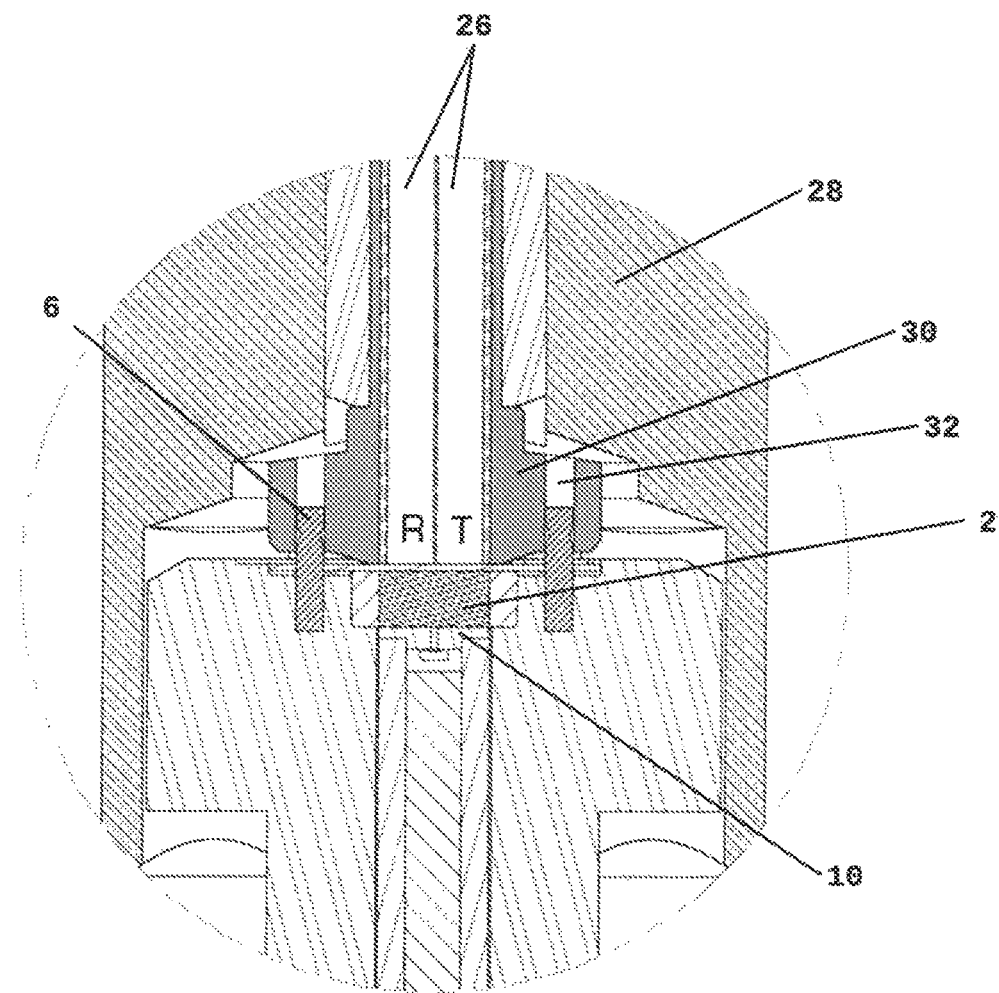
FIG. 5 is a detail view of Section A of the tension wrench of FIG. 4.

FIG. 4 illustrates how a fiber optic attachment 24 in the style of a tension wrench interfaces with the Opti-Hydraulic Transducer 1 of FIGS. 1-3. The interface between the fiber optic attachment 24 and the Transducer 1 is best seen in FIG. 5 which is a detail view of Section A of FIG. 4. Fiber optic attachment 24 includes a fiber optic cable 26 preferably provided with at least two fibers, a transmitter "T" fiber and a receiver "R" fiber. The fiber optic attachment 24 further comprises a hexagonal socket 28 to engage and drive hexagonal head of the fastener 1. Fiber optic attachment includes, in a proximal and central portion within hexagonal socket 28, a nosepiece 30 that includes locating holes 32 adapted to receive pins 6. In this manner, when the fiber optic attachment 24 is placed upon the fastener 1, fiber optic cable 26 is precisely oriented with respect to the transparent datum window 2. Light is transmitted within the transmitter side "T" of fiber optic cable 26, such that the transmitted light exists the end of cable 26, and reflects off of gage pin indicator slab 10. The reflected light is received by the receiver side "R" of fiber optic cable 26. As tension is applied to the fastener 1, gage pin indicator slab 10 moves away from transparent datum window 2, and the space between is filled with indicator fluid. Accordingly, the incident light is absorbed by the fluid in an amount proportional to the amount of fluid between transparent datum window 2 and gage pin indicator slab 10, and the relative intensity of reflected light received within the receiver side "R" of the cable 26 is proportional to the amount of tension on the fastener 1.

Figure 6:
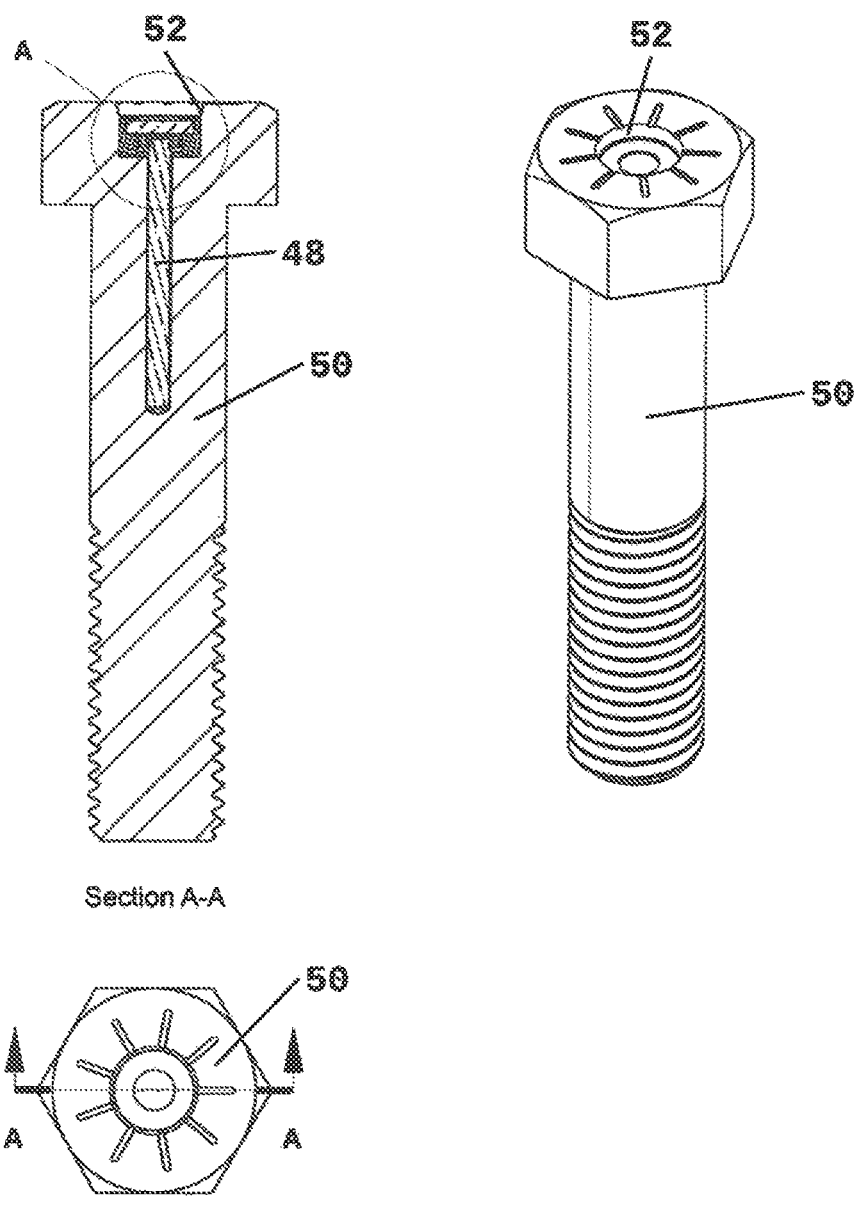
FIG. 6 includes isometric, top and cross-sectional views of a second embodiment of an Opti-Hydraulic Embedded Displacement Transducer.
Figure 7:
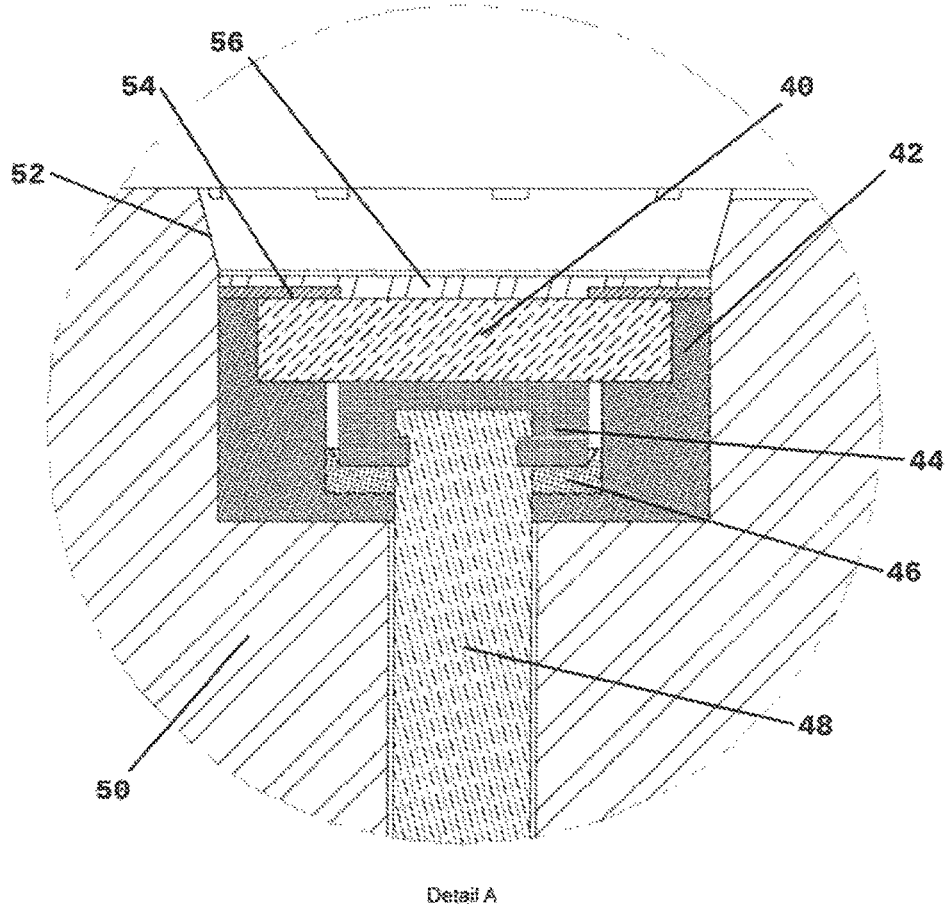
FIG. 7 is a detail view of Section A of FIG. 6.

FIGS. 6 and 7 illustrate a second exemplary embodiment of the invention. FIG. 6 includes isometric, top and cross-sectional views of section A-A of the top view of the embodiment. FIG. 7 is a detailed view of section A from FIG. 6. The second embodiment is substantially the same as the first, with a few differences to be highlighted here. As best illustrated n FIG. 7, the second embodiment includes a one-piece transparent datum window 40 mounted within porous filling channel 42. Porous gage pin indicator slab 44 abuts one-piece transparent datum window 40. Porous gage pin indicator slab 44 is preferably permanently joined to solid gage pin cylinder 48. The assembly of solid gage pin cylinder 48 and porous gage Pin indicator slab 44 sits on closed cell elastomeric foam gasket 46. Porous filling channel 42 is preferably permanently mounted within fastener body 50. Fastener body 50 is machined or formed to have a locating taper 52. Data shield 54 is placed in contact with porous filling channel 42 and one-piece transparent datum window 40 before these features are encapsulated by a transparent epoxy layer 56.

Figure 8:
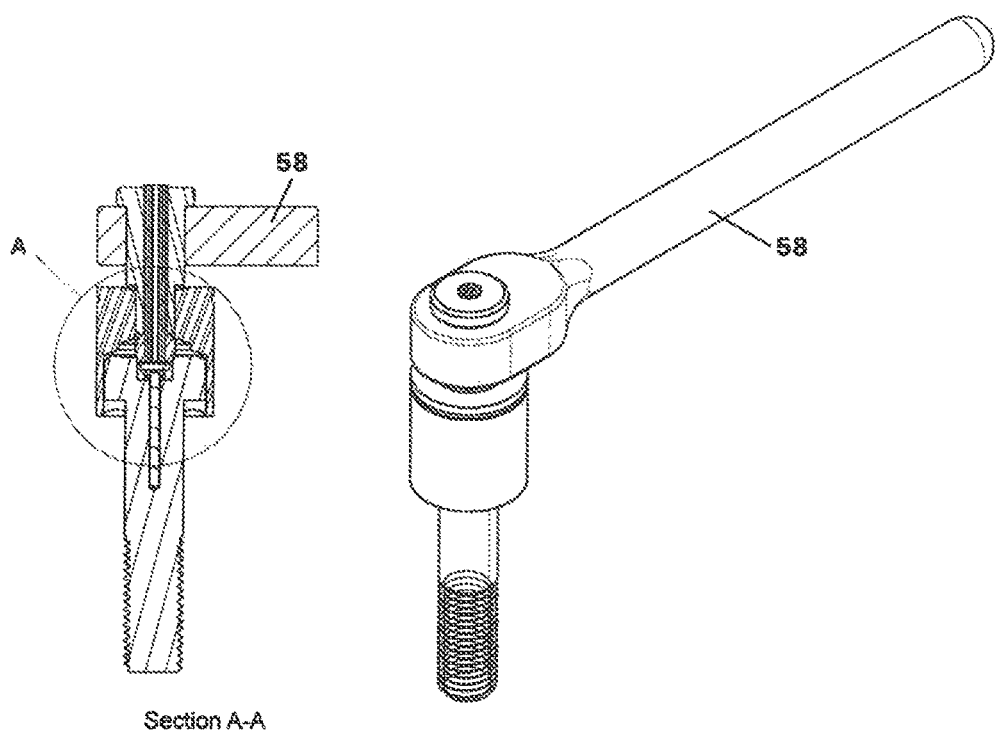
FIG. 8 includes isometric, top and cross-sectional views of a tension wrench in use with the embodiment illustrated in FIGS. 6-7.
Figure 8:
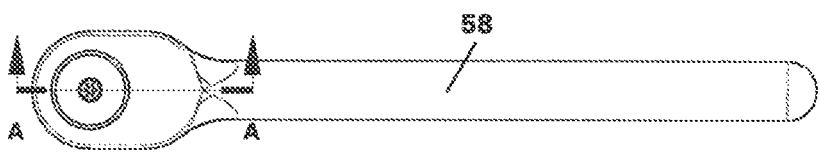
Figure 9:
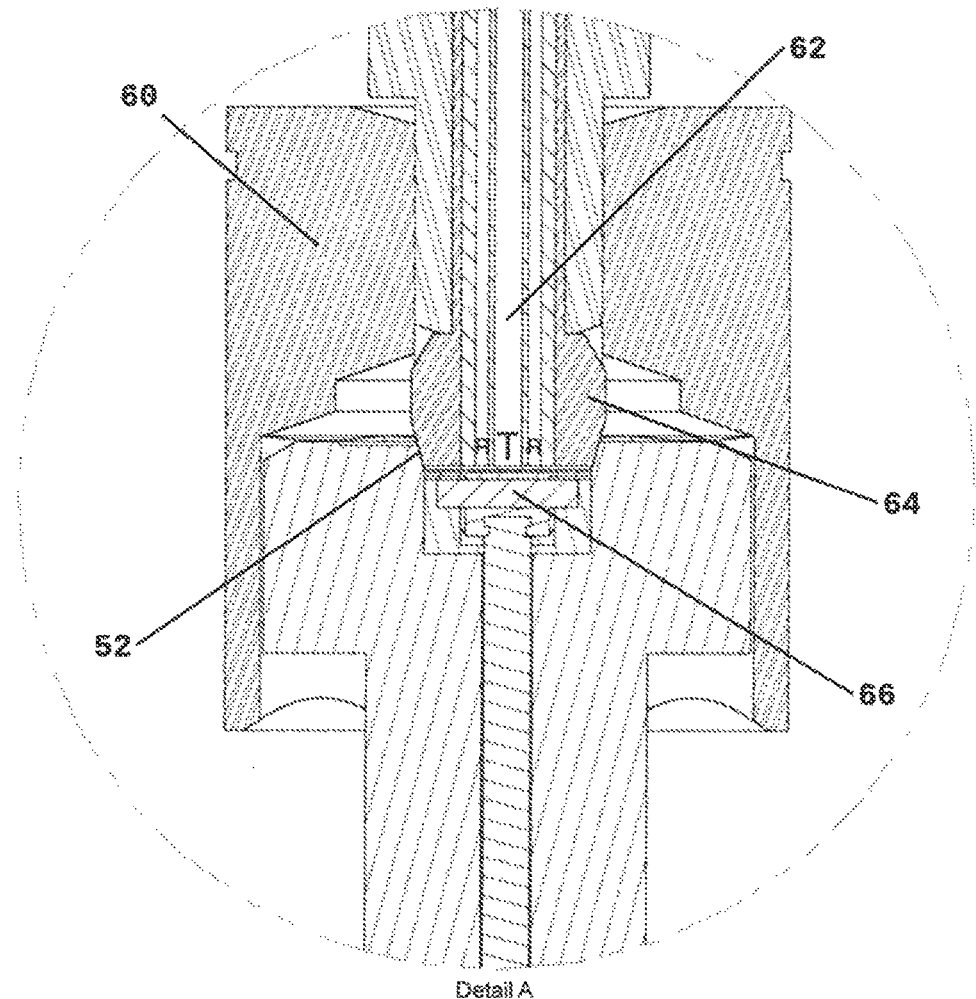
FIG. 9 is a detail view of Section A of FIG. 8.

FIG. 8 illustrates how a fiber optic attachment 60 in the style of a tension wrench 58 interfaces with the second embodiment of Opti-Hydraulic Transducer. FIG. 9 is a detail view of the interface style of the second embodiment shown in Section A of FIG. 8. A coaxial fiber optic cable 62 terminates at fiber optic nosepiece 64. The nosepiece 64 mates with locating taper 52 to precisely locate the fiber optic cable 62 relative to the transducer 66. The central fiber of the fiber optic cable 62 is the transmitter "T" fiber. Incident light strikes the transducer 66 and reflects back where annularly located receiver fibers "R" receive the signal.

Figure 10:
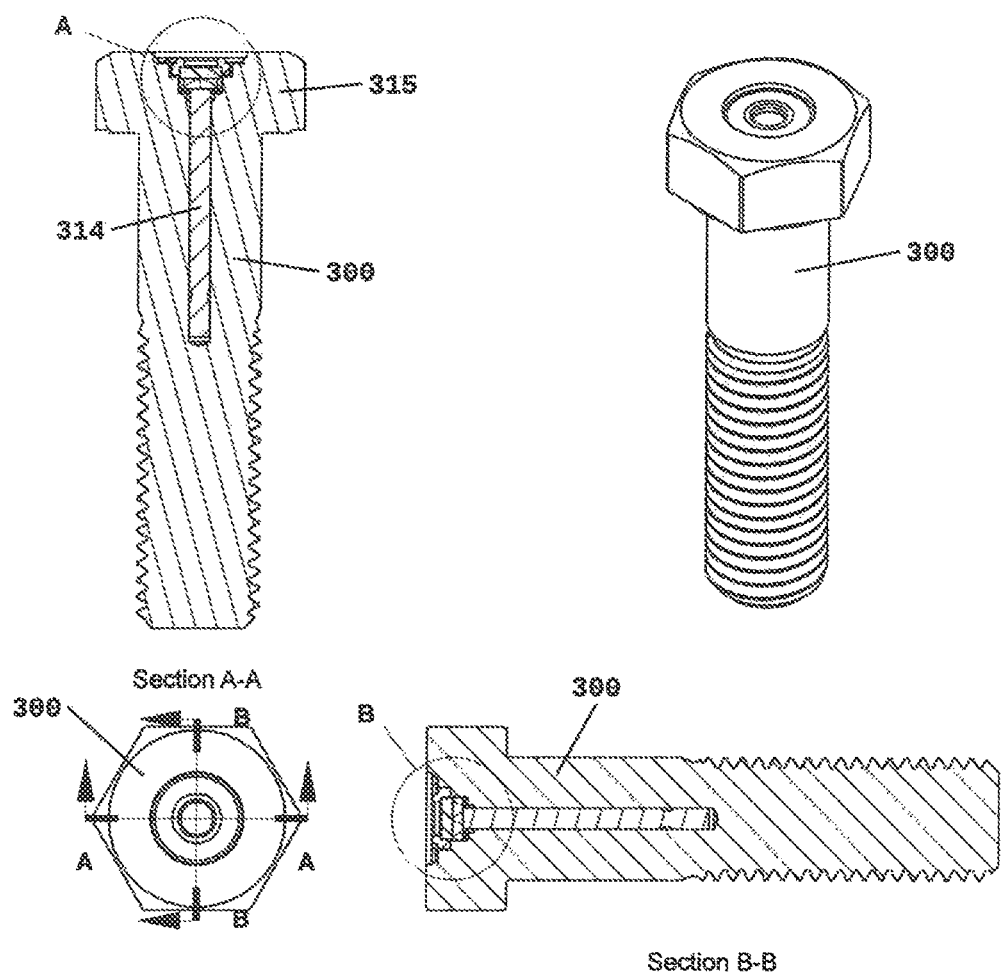
FIG. 10 includes isometric, top and cross-sectional views of a third embodiment of a Chromaulic Sensor according to the invention.
Figure 11:
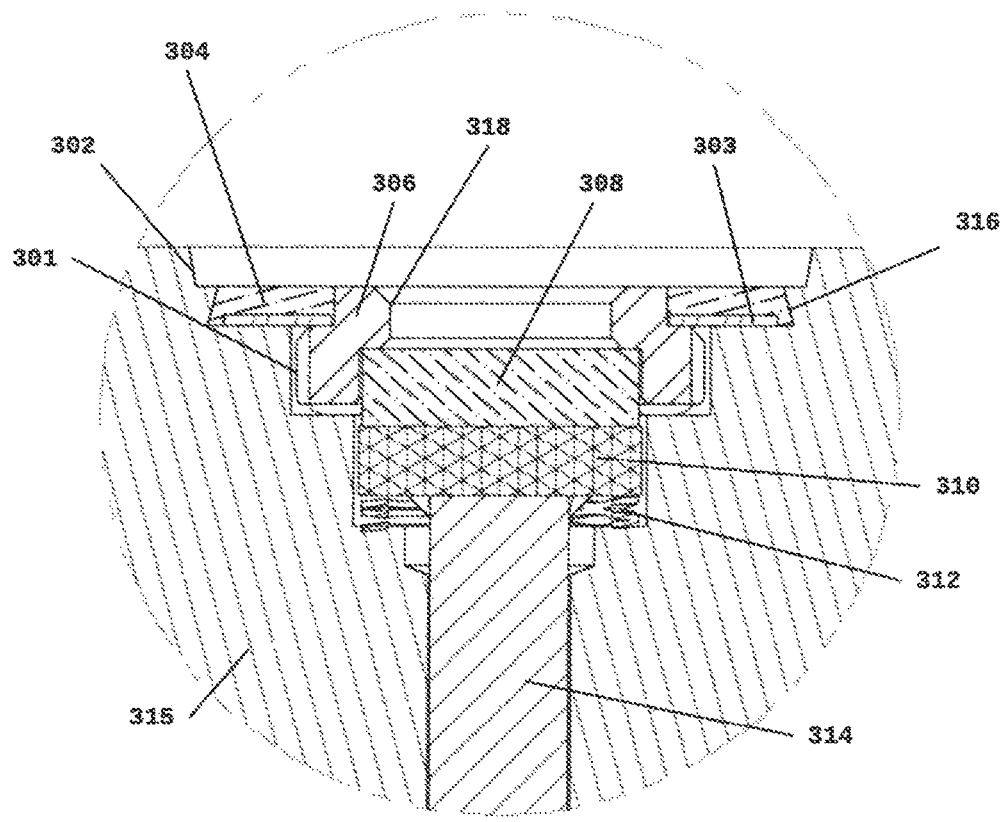
FIG. 11 is a detail view of Section A of FIG. 10.

FIGS. 10-11 illustrate a third exemplary embodiment of the invention. FIG. 10 includes an isometric view of a chromaulic sensor 300, together with a top view, and cross-sectional views of sections A-A and B-B shown in the top view. Metal pin 314 is joined to porous slab 310. The bond between the porous slab 310 and the metal pin 314 is preferably by adhesive such as epoxy, mechanical bonding during the forming of the slab, press fit, or any other suitably rigid connection. The combination of metal pin 314 and porous slab 310 forms a gage pin assembly. Wave spring 312 is squeezed between the gage pin assembly and the mechanical body 315. The transparent glass window 308 mates with the porous slab 310 to create the sensor's zero point, that is, when there is no tension on the fastener, the facing surfaces of transparent datum window 308 and porous slab 310 are preferably in contact. Window ring 306 secures the transparent datum window 308 in place. The window ring 306 has integrated ported style filling channels 301. The data shield 303 and epoxy seal 304 seal the assembly. An undercut wall 316 enables mechanical locking of the composite epoxy/metal bond. There are two locating features designed into the third embodiment, the first is the outer locating taper 302 and the second in the internal locating ring 318.

Figure 12:
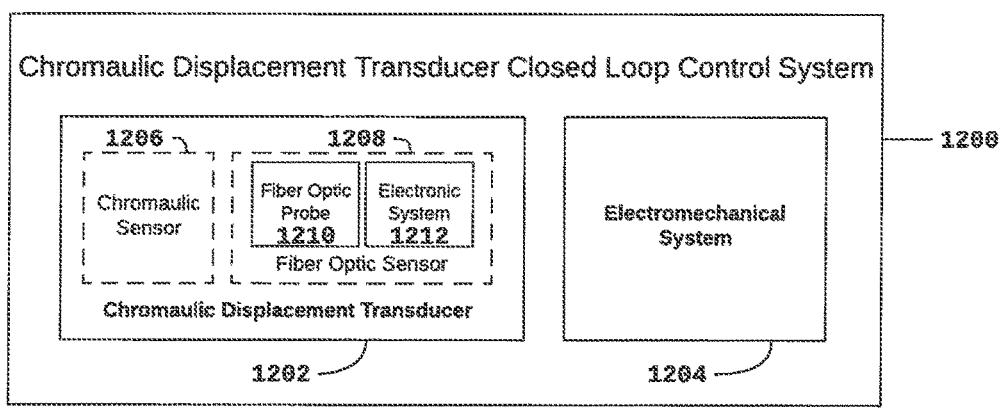
FIG. 12 is a block diagram of an exemplary chromaulic displacement transducer closed loop control system according to an exemplary embodiment of the invention.

A chromaulic displacement transducer closed loop control system 1200 will now be described in connection with FIG. 12. The system 1200 comprises two major subsystems, the chromaulic displacement transducer 1202 and the electromechanical system 1204. The transducer 1202 includes the chromaulic sensor 1206, and the fiber optic sensor 1208. The chromaulic sensor 1206 serves as the embedded hardware within the mechanical body and measures displacement or elongation of the mechanical body, indicating the same with a color change, absorption of light, or other suitable means as discussed above. The fiber optic sensor 1208 observes the chromaulic sensor's indication and makes it quantifiable by converting it to an analog voltage. The fiber optic sensor 1208 includes two main subsystems, the fiber optic probe 1210 and the electronic system 1212. The chromaulic displacement transducer 1202 provides a practical and easy to use tool that directly measures the displacement of a body which does not require electricity or power on the sensing side. This feature is particularly useful in harsh environments where other available sensors are not practical. When the chromaulic displacement transducer 1202 is integrated with an electromechanical system 1204, a true closed loop control system 1200 of displacement becomes possible. The electromechanical system 1204 can take many forms since there are many such systems. For illustrative purposes a threaded fastener with embedded tension sensor such as those described above could be used together with a powered torque driver, an electrically actuated pneumatic or hydraulic valve driving a compatible torque driver or wrench, or an electrically actuated hydraulic tensioner, or the like. Of course, those of ordinary skill in the art will readily appreciate that any suitable driver could be used with a chromaulic displacement transducer. Furthermore, the electromechanical system may include a human machine interface, HMI, such that a human may operate the driving device and the electrical system can provide feedback to "control" the human's motor skills by signaling when to take action. An LED light or display or audible signal indicating to the human user that additional action is necessary or alternatively when actions should be ceased is considered within the scope of the closed loop control system 1200 including the electromechanical system 1204. The closed loop control system's primary function is to provide a conditioned actuating signal and control error of displacement or tension.

The chromaulic sensors described herein serve as the foundation of new and novel technology. Several features of exemplary embodiments of the invention provide advantages over conventional solutions. These features included a permeable displacement sensor, post-assembly filling channels, an optically transparent datum window, electromagnetic radiation sensitive fluid, a compressible reservoir, a sealing data shield, and a fiber optic interface.

The displacement sensor described in connection with the first three embodiments is embodied in a gage pin 14, 48, 314. The gage pin senses the gage portion of the displacement within the mechanical body. That is, as tension is applied to the fastener body, the gage pin, which is attached to a distal portion of the fastener body, moves distally away from the transparent datum window due to lengthening of the fastener body. Indicator fluid fills the space between the transparent datum window and the gage pin, and thereby visibly indicates the displacement of the gage pin through the transparent datum window. Those of ordinary skill in the art will readily appreciate that the invention is not limited to using a gage pin, and any suitable displacement measuring device, such as a mechanical flexure concept, or any other suitable solution could be utilized in place of the gage pin. A few such concepts are described in U.S. Pat. No. 5,189,979 and U.S. Pat. No. 3,602,186. Embodiments of the present invention advantageously employ a permeable displacement sensor. Permeability is novel and important because in prior designs, there has been a tendency for the fluid to cavitate during tightening as the surfaces of the datum window and gage pin separate during displacement. A vacuum is formed between the surfaces as the fluid attempts to flow between the microscopic gap. The localized region of high vacuum causes the fluid to change state from liquid to a gas. The gas vapor appears as a "bubble" that displaces the light sensitive fluid causing no light absorption to occur in that region. This phenomenon causes undesirable irregularity of indication. The physical problem is resolved, however, with the use of a permeable sensor as a gage pin. Two forms of permeability are described herein, ported and porous. The first embodiment described above utilizes a ported design that allows fluid to flow from the center of the gage pin as displacement occurs. A second port within the gage pin is used to allow for unrestricted flow to minimize the pressure differential. In the second and third embodiments described above, a fully porous gage pin is used. The porous design has the advantage of hundreds or thousands of individual ports that reduces the amount of flow required by the fluid. The fluid permeates the space between the gage pin and transparent datum window as the two structures separate. This flow mechanism gives embodiments of the present invention a hydraulic behavior which is significantly distinct from previous designs.

Figure 17A:
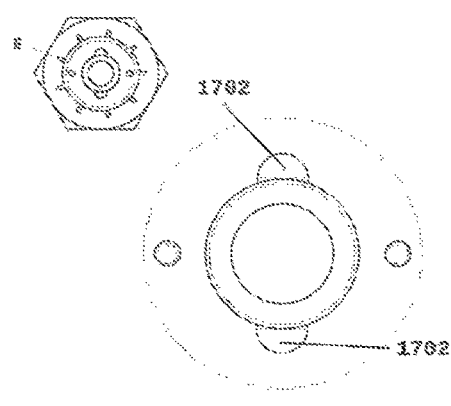
FIGS. 17A-17C are top views of exemplary embodiments of the invention.
Figure 17B:
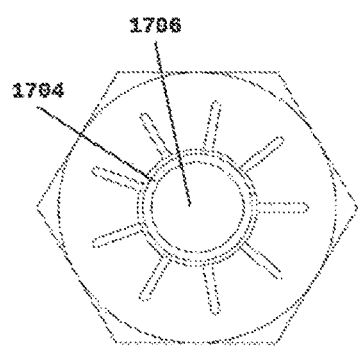
Figure 17C:
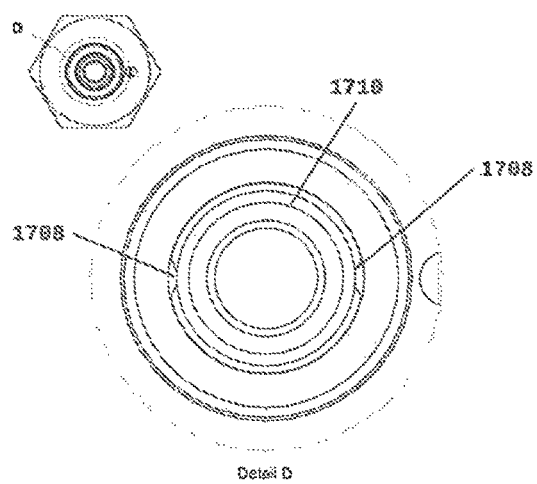

Another advancement of exemplary embodiments of the invention are post assembly filling channels. As has been recognized, the assembly process of opti-mechanical strain indicators can be a challenge. Accordingly, there is a need for advances in manufacturability. Post assembly filling channels are unique to opti-hydraulic or chromaulic displacement sensors. Similar to the permeable gage pin, two types of filling channels are shown in the embodiments described above and shown further in FIGS. 17A-17C, ported and porous. The first embodiment shown in FIG. 17A has two ported type filling channels 1702 that are preferably machined in to the mechanical body. The number of ports is optional but at least two is preferred unless filling within a vacuum. A second port assists in fluid filling by allowing trapped air to escape via the second port. The second embodiment illustrated in FIG. 17B utilizes a porous filling channel 1704 of annular shape that surrounds the transparent datum window 1706. This composite material advantageously uses capillary action during filling, and also exhibits improved fluid retention once filled. The third embodiment illustrated in FIG. 17C illustrates that the filling channels 1708 may be incorporated into other assembly components like the window ring 1710. Each of these methods are suitable to filling the chromaulic sensor post assembly, which has the additional benefit that the sensor may be batch processed by submerging a plurality of sensors within indicator fluid simultaneously. Batch processing is a manufacturing technique that is well suited for low cost mass manufacturing.

A third aspect of exemplary embodiments of the invention is an optically transparent datum window. The transparent datum window is described as a datum because it is this point in the sensor that acts as the reference to which deflection is measured. That is, at rest the distal surface of the datum window is preferably in contact with the proximal surface of the gage pin, and the gage pin moves distally away from the datum window as tension is applied to the device body. Accordingly, the distance between the two surfaces is a measurement of strain on the device body. The datum defines the zero point of the sensor relative to which displacement will be measured. Glass material is a preferred material for the datum window due to its dimensional stability through a wide range of temperatures. Other transparent materials like acrylic, polycarbonate, or epoxy are also suitable for use, but within narrower temperature ranges about room temperature. A more exotic material like synthetic crystals could be utilized for application in extreme temperatures.

A fourth aspect of exemplary embodiments of the invention is the use of an electromagnetic radiation sensitive fluid. In a preferred embodiment, the fluid affects the visible spectrum. This makes the sensor visible to the human eye, which is useful in most contexts. However, while there are advantages to utilizing visible light, the principles outlined herein would apply to any other fluid that will absorb other portions of the electromagnetic spectrum such as ultraviolet, infrared, or microwave. Exemplary embodiments of the invention preferably utilize a light absorbing fluid, but light filtering may also be utilized. U.S. Pat. No. 8,540,468 describes a "smart lid" which focuses on the light filtering aspects of opti-mechanical indicators such as those described in U.S. Pat. No. 3,987,699. The '468 patent describes a color sensor that sits at a distance from the indicator and inspects the color in terms of RGB values or corresponding to the wavelengths of received light. By contrast, exemplary embodiments of the present invention respond to the attenuation of electromagnetic radiation as the controlled incident radiation is absorbed by the fluid. Advantageously, light absorption occurs according to Beer and Lambert's law and is not dependent on wavelength.

A fifth aspect of exemplary embodiments of the invention is a compressible reservoir. The first and second embodiments described above employ a closed cell elastomeric foam. The closed cell nature of the foam traps gas within the cells that can be compressed under pressure. Also, the closed cell foam doesn't allow the fluid to be absorbed into the structure of the foam. The third embodiment described above utilizes a confined gaseous atmosphere 1510. The confined gaseous atmosphere 1510 is prevented from entering the viewing window. U.S. Pat. No. 3,850,133 presents a form of compressible reservoir in a "free space" contained within a flexible housing. However, the '133 patent describes a capsule as being "entirely filled." which illustrates that the '133 patent does not account for the nature of a confined gaseous atmosphere 1510. The confined gaseous atmosphere 1510 supports a thermodynamic steady state. Unless the surrounding environment is strictly controlled in terms of pressure and temperature, fluids produce a gas vapor atmosphere that creates phase equilibrium in accordance with the fluid's vapor pressure. By controlling the volume and geometry of this atmosphere, embodiments of the invention prevent the gaseous phase from entering the viewing window area. This design attribute aligns physical phenomenon with the engineered design. The presence of the permeable gage pin and confined gaseous atmosphere 1510 each promote a steady state condition that will allow for a stable fluid based indication extending for an indefinite period of time. In addition, the confined gaseous atmosphere 1510 also compensates for expansion and contraction of fluids and materials under temperature changes. See FIG. 16.

A sixth aspect of exemplary embodiments of the invention is the sealing data shield. The three embodiments described herein each utilize a rigid barrier and an epoxy seal. The data shield may be made of any suitably rigid material that may act as a barrier. This feature is called a data shield because it not only shields the fluid boundary from the epoxy layer but the rigid barrier is also able to be marked by laser etching or the like for unique identification and data. The epoxy or potting adhesive used for sealing may be of any suitable chemical formulation. The curing mechanism could be a two part chemical reaction, UV curable, or single component heat, air, or moisture cure.

Figure 16:
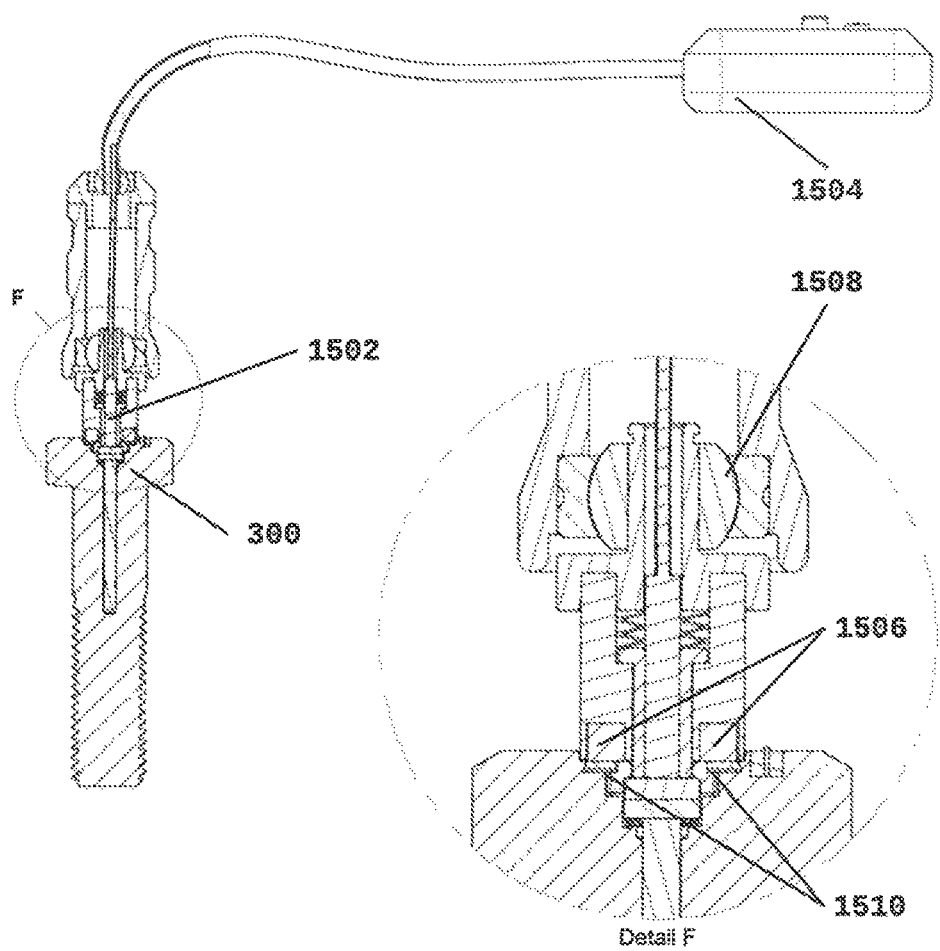
FIG. 16 is a cross-sectional and detail view of the of FIG. 15.

A seventh aspect of exemplary embodiments of the invention is a fiber optic probe locating interface. The locating interface preferably provides for concentric locating of a mating fiber optic probe, although a non-concentric location should be considered within the scope of the invention. The locating feature may be embodied by a simple tapered connection such as that shown in the second embodiment, or could be more complex like locating pins shown in the first embodiment. In the first embodiment, the locating pins have detents that enable a clip-in mechanical connection. In the third embodiment, a magnetic connection 1506, shown in FIG. 16 is utilized and two potential locating surfaces are available depending on the fiber optic probe. These embodiments should be understood to be exemplary, and any suitable locating feature, such as a threaded connection, are considered to be within the scope of the invention. The locating interface advantageously provides a consistent optical coupling between the fiber optic probe and the chromaulic sensor. It should be appreciated that the optical coupling may be permanent or removable. If removable, a transparent oil at the interface is preferred. The use of an optical coupler such as a transparent oil reduces internal reflections between the surfaces by providing a medium with an index of refraction that is more like that of the optical fiber and glass window of the chromaulic sensor. A permanent optical coupling can be achieved by substituting a clear epoxy instead of the coupling oil. The optical coupling is not a requirement for the design to function, however it improves the accuracy and consistency of the measured signal.

As discussed, manufacturability is a key factor to the success and marketability of products utilizing the chromaulic sensor. Exemplary embodiments of the present invention improve manufacturability by enabling filling of the chromaulic sensor with its indicator fluid after it has been assembled. The fluid filling process could be achieved through simple gravity filling, wicking or capillary action, and also vacuum impregnation.

Figure 13:
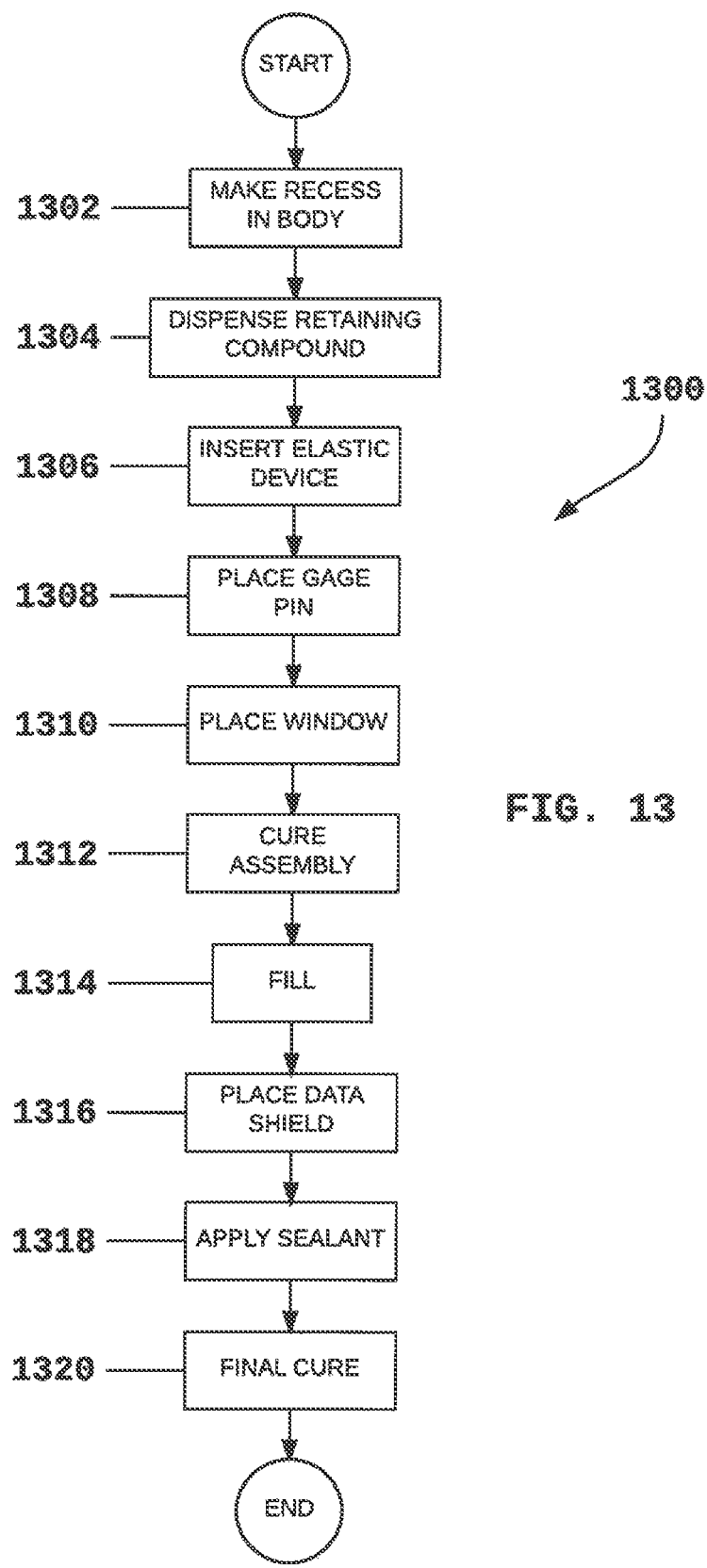
FIG. 13 is a block diagram of a method of making an embodiment of the present invention.

An exemplary assembly process prior to filling according to an embodiment of the invention will now be described in connection with FIG. 13. The assembly process 1300 starts with the step of creating a recess 1302 within the device body to house the sensor components. Typically, a substantially cylindrical hole is bored into the device body, although any suitable method of creating the recess may be used. Next, at step 1304, a retaining compound is dispensed into the bottom (distal end) of the recess. At step 1306, an elastic device is inserted into the recess. The elastic device may be a spring, such as a wave spring, or another elastic device such as a closed cell foam element. The elastic element presses the gage pin against the transparent datum window during curing of the retaining compound. At step 1308, the gage pin is inserted into the recess. At step 1310, the transparent datum window, and any related components such as a window ring are placed. The window is preferably permanently fixed to the device body using press fit, adhesive, staking, or swaging, or any other suitable method of fixing. At step 1312, the assembly is cured. Advantageously, the window is now fixed to the device prior to the filling step. At step 1314, the sensor is filled with indicator fluid. At step 1316, the data shield is placed over the transparent datum window. At step 1318, a sealant, such as epoxy is applied over the data shield. At step 1320, the assembly is cured by suitable means.

Another manufacturing method that may be utilized is 3D printing or direct metal laser sintering. The traditional sensor design utilizes a separate fastener body, gage pin, and window datum. The recess within the fastener body is typically manufactured using CNC machining. However, current additive manufacturing processes have the potential to make simple low cost indicators for specialty applications without the need for CNC machining of the recess. The additive 3D printing or DMLS process may use sections that run parallel to the axis of the fastener body to provide sufficient tensile strength. This exemplary oriented grain structure could enable components of materials unable to currently be 3D printed such as glass to be inserted mid process. This process is a continuation of the embedded composite nature consistent with concepts presented herein.

Figure 14:
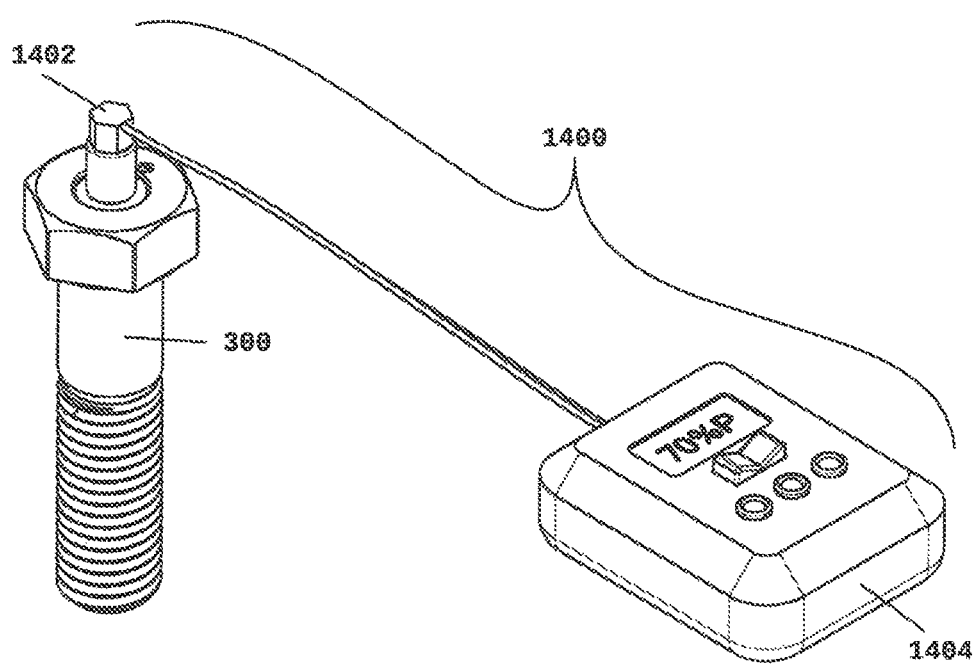
FIG. 14 is an isometric view of a transducer system according to an exemplary embodiment of the invention.
Figure 15:
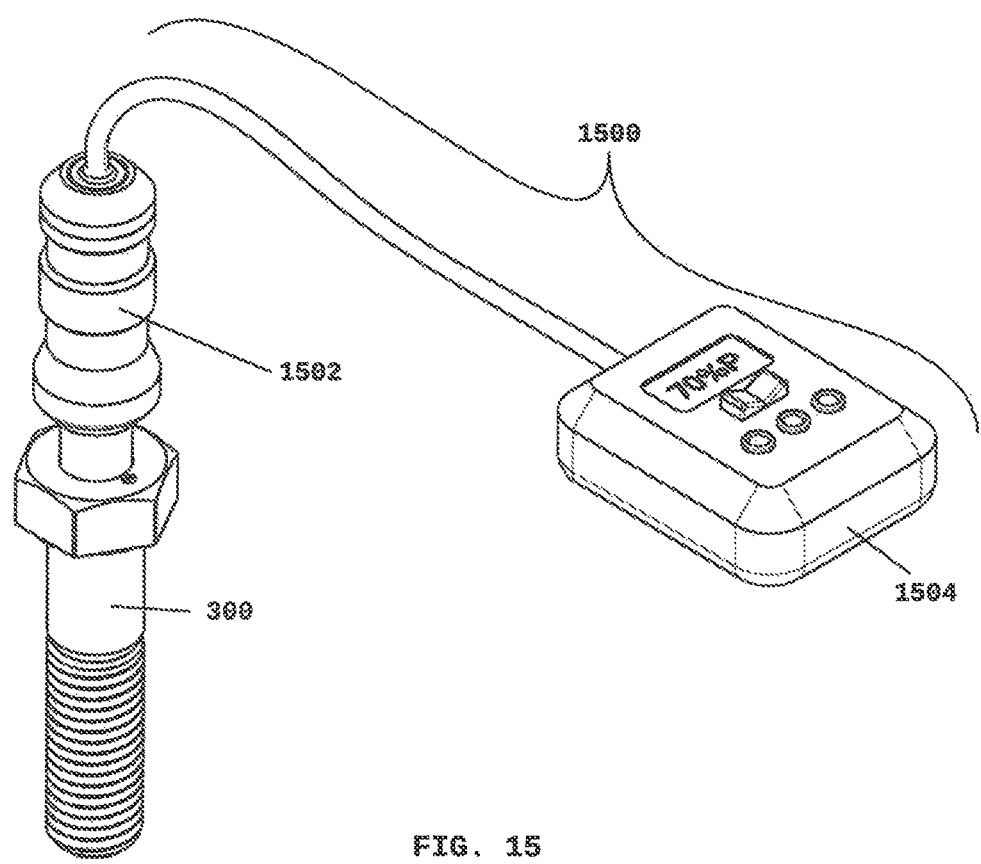
FIG. 15 is an isometric view of another transducer system according to an exemplary embodiment of the invention.

A fiber optic sensor 1400 or 1500 according to exemplary embodiments of the invention is shown in FIGS. 14-16. The fiber optic sensor 1400, 1500 comprises a fiber optic probe 1402, 1502 and an electronic system 1404, 1504. The fiber optic probe 1402, 1502 is the counterpart to the fiber optic interface within the chromaulic sensor 300. The fiber optic probe 1402, 1502 consists of both transmitter and receiver optical fibers. The fibers may be oriented in a parallel configuration as in the first embodiment described above, or in a coaxial orientation as in the second and third embodiments, or any other suitable orientation. The fiber optic probe 1402, 1502 preferably has locating features that match the locating features of the chromaulic sensor 300. The fiber optic probe can be a simple static device 1402 like that shown in the low-profile configuration illustrated in FIG. 14, or more a more complex dynamic device 1502 like that shown in FIG. 15. The straight probe connection device 1502 utilizes spherical bearings 1508 and other design features that help ensure consistent alignment even while, for example, a handheld wrench is moving around. The fiber optic probe 1402, 1502 can advantageously be integrated with drives of an automatic power wrench or similar devices. As discussed above, in the fiber optic interface, the fiber optic probe can be temporarily or permanently mounted.

The electronic system 1404, 1504 manages the transmitting and receiving optical signals. The electronic system 1404, 1504 comprises an electromagnetic radiation producing device for the transmitter signal. This is preferably an LED or LASER, but any suitable electromagnetic radiation device could be used. The electronic system 1404, 1504 further comprises a photoelectric device on the end of the receiver fiber to measure and convert the reflected light signal into a voltage or current. The photoelectric device will produce an analog voltage or current inversely proportional to displacement. That is, the more displacement there is, the less electromagnetic radiation will be reflected back to the receiving fiber.

Figure 18:
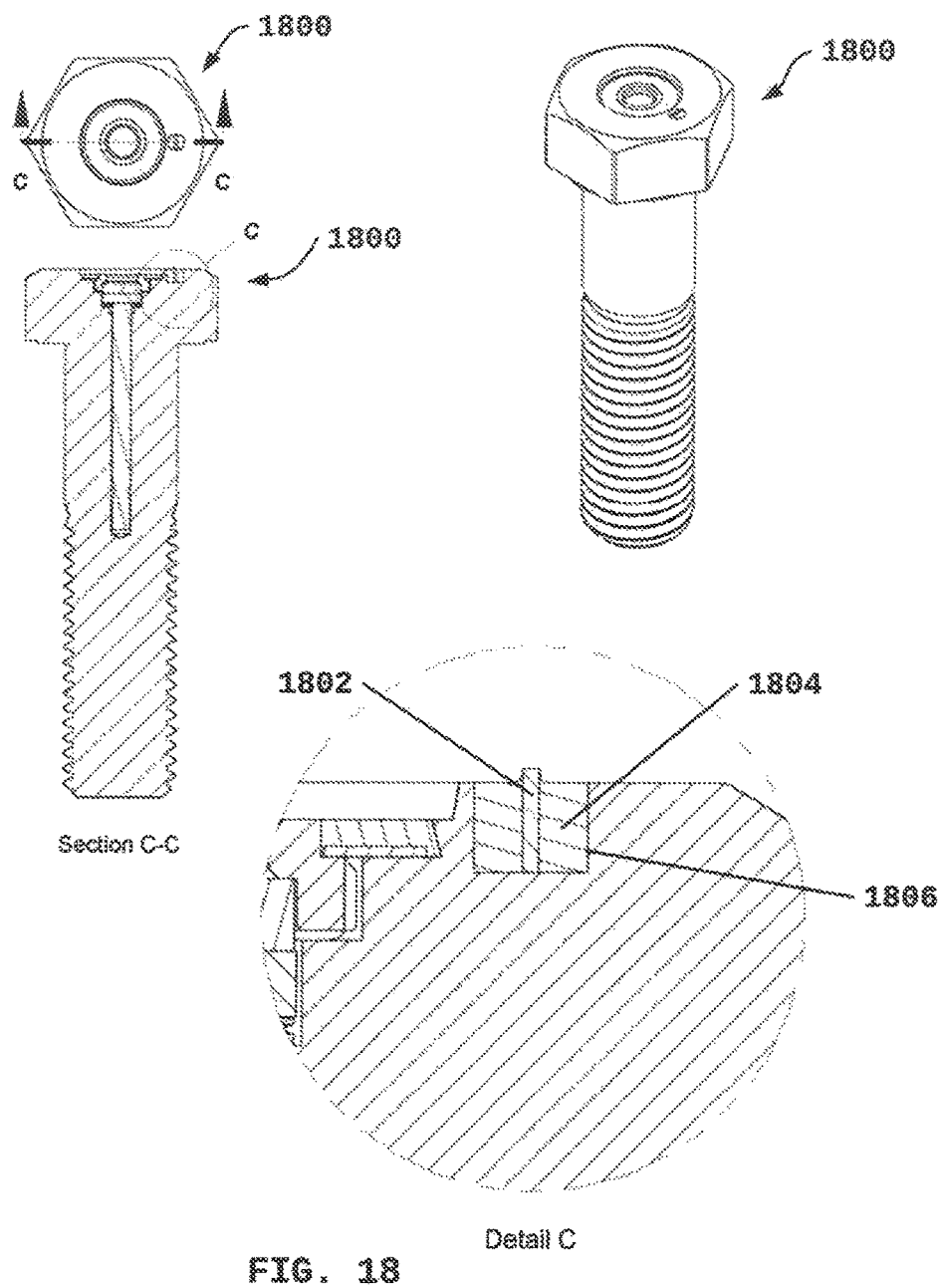
FIG. 18 includes isometric, top, cross-sectional and a detail view of a fourth embodiment of the invention.

A fourth embodiment of a sensor 1800 formed as a fastener according to an exemplary embodiment of the invention is illustrated in FIG. 18. FIG. 18 includes an isometric view of a sensor 1800, as well as a top view, a cross-sectional view taken along section C-C of the top view, and a detail view of section C from the cross sectional view. Sensor 1800 includes an RFID transponder 1802 incorporated into the device body. The RFID transponder 1802 is secured by RFID potting material 1804 or the like. The electronic system described above reads the RFID transponder 1802 embedded within the mechanical body of the chromaulic sensor 1800. As shown in FIG. 18, the embedded RFID transponder 1802 is located in a machined recess 1806 with a portion of the RFID transponder 1802 preferably exposed to enhance the transponder antenna's reception. The RFID transponder 1802 is preferably potted or encapsulated using a compatible potting compound for electronics. The RFID transponder 1802 is preferably passive so that no electric power source is required on the chromaulic sensor 1800. However, an active RFID transponder could be used to increase the read range or in an environment where electrical energy is easily available. The RFID transponder 1802 stores local data. Information such as bolt serial number, material strengths, design information, test results, or inspection logging could be stored and periodically updated as needed. The control system or other accessory devices could have access to the locally stored data to provide information to a database. The electronic system can have an optional ability to read and write tension data gathered during installation or inspection. The local data storage supports a decentralized network that could make simple information gathering practical as smart devices like smart fasteners become integrated into industrial networks.

Figure 19:
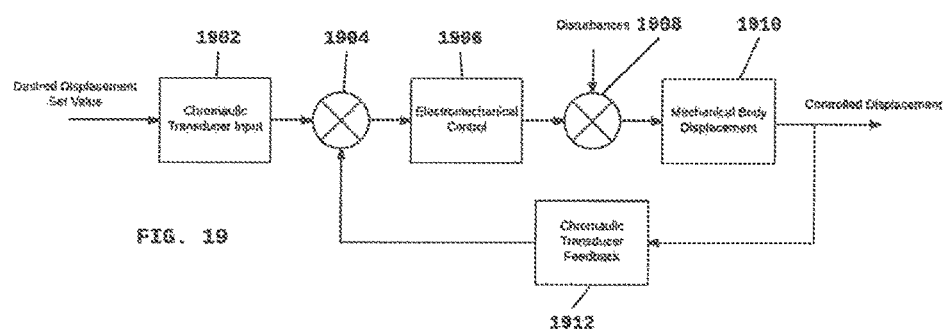
FIG. 19 is a block diagram of a displacement control system according to an exemplary embodiment of the invention.
Figure 20:
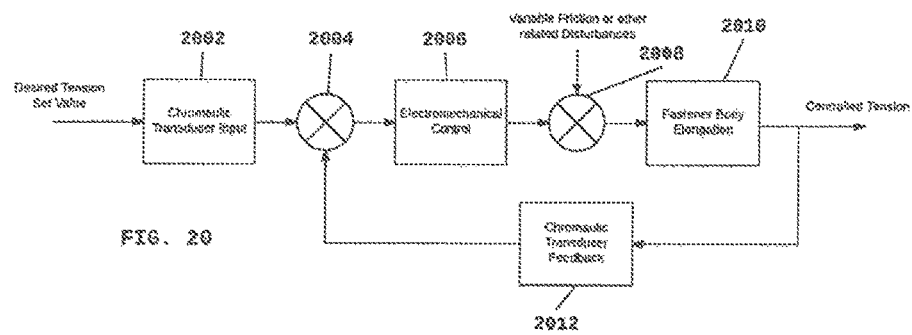
FIG. 20 is a block diagram of a displacement control system according to another exemplary embodiment of the invention.

As discussed above, the combination of a chromaulic displacement transducer and an electromechanical system enable the creation of a closed loop control system. The Electromechanical system is composed of the electrical system and the mechanical system. The electrical system is responsible for information processing and control. This begins with an analog to digital converter that takes the analog voltage output of the chromaulic transducer and converts it into a digital signal that enhances the compatibility of the information with other electronic systems. The electrical system could utilize a microcontroller or programmable logic control that provides input/output channels to control the mechanical system. This electrical system can take on a vast array of configurations depending on the level of complexity and performance desired from the system. The fundamental abilities however are feedback error calculation and control signaling. FIG. 19 illustrates a functional block diagram of a control system for generalized displacement according to an exemplary embodiment of the invention. As illustrated, a desired displacement value is received at the chromaulic transducer input 1902. The desired value is compared to transducer feedback at a compare block 1904, and a resulting comparison signal is sent to electromechanical control block 1906. The control signal is compared to disturbance signals, at control block 1908, and a resulting control signal is sent to the mechanical body displacement device 1910. A signal representing the actual displacement value is then fed back to the chromaulic transducer feedback block 1912 to be used in further comparisons in the control system. FIG. 20 illustrates a functional block diagram of a control system for tension control according to a further exemplary embodiment of the invention. As illustrated, a desired tension value is received at the chromaulic transducer input 2002. The desired tension value is compared to transducer feedback at a compare block 2004, and a resulting comparison signal is sent to electromechanical control block 2006. A control signal is compared to disturbance signals, at control block 2008, and a resulting control signal is sent to the fastener body elongation device 2010. A signal representing the actual tension value is then fed back to the chromaulic transducer feedback block 2012 to be used in further comparisons in the control system. An assembly error detection algorithm within this electronic system may also be included. Electrical systems used with embodiments of the invention could incorporate networking communication and data storage. With the ability to read or write data to and from the chromaulic sensor, the integration of displacement or tension data gathered from chromaulic sensors is possible. The electrical system may further integrate a fiber optic probe as described above for reading RFID transducers simultaneously with reading the chromaulic sensor by integrating an RFID antenna into the fiber optic probe. The mechanical system is the portion of the control system that actually influences the physical objects by inputting the mechanical energy necessary to create displacement with the mechanical body. The mechanical system could take the form of a direct tensioning device operated by hydraulics or the controlled application of heat. The mechanical system could also take the form of the application of torque to a thread create displacement, which torque could be applied manually, hydraulically, pneumatically, or electrically. The mechanical system could also be powered directly by hydraulically or pneumatically pressurized systems. Another system within the control system is the electromechanical system that operates between the electrical and mechanical systems. This subsystem preferably comprises standard components such as pneumatic solenoid valves which can allow for fully automated closed loop control. Another electromechanical embodiment would be an audible or visual feedback signal that notifies a human operator to input manual mechanical energy. This human machine interface, HMI, creates a form of bio-electromechanical control system.

Figure 21:
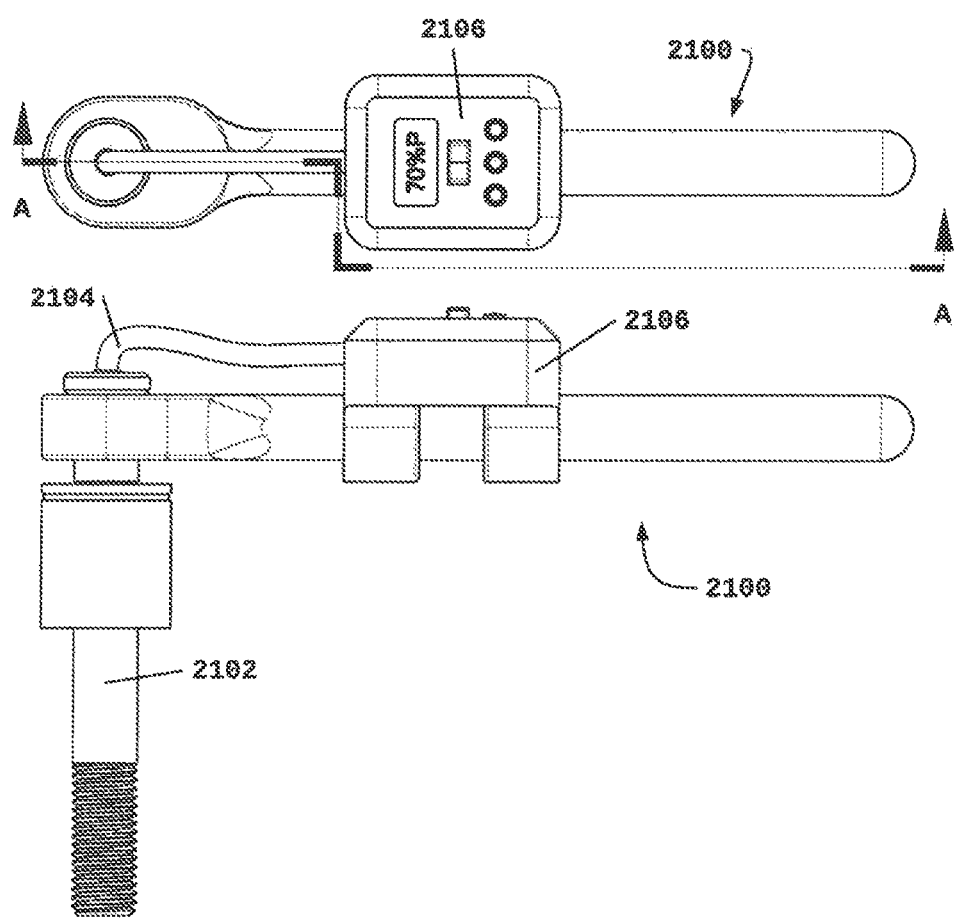
FIG. 21 includes top and elevation views of a manual wrench with closed loop control system according to an exemplary embodiment of the invention.
Figure 22:
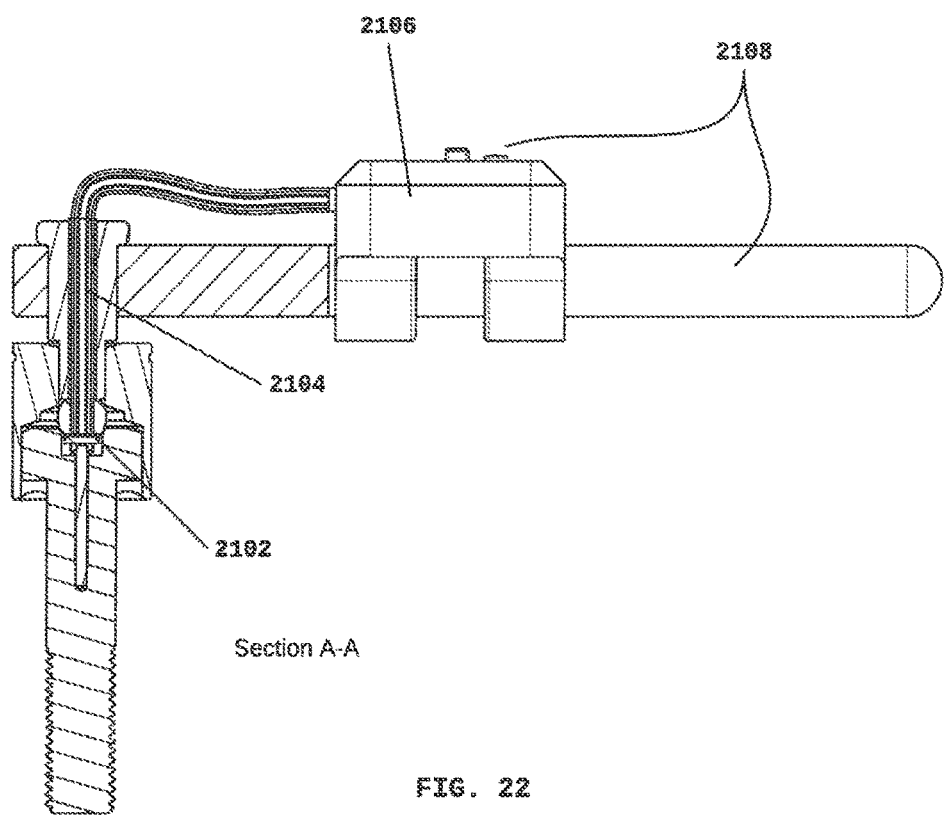
FIG. 22 is a cross-sectional view of the embodiment of FIG. 20.
Figure 23:
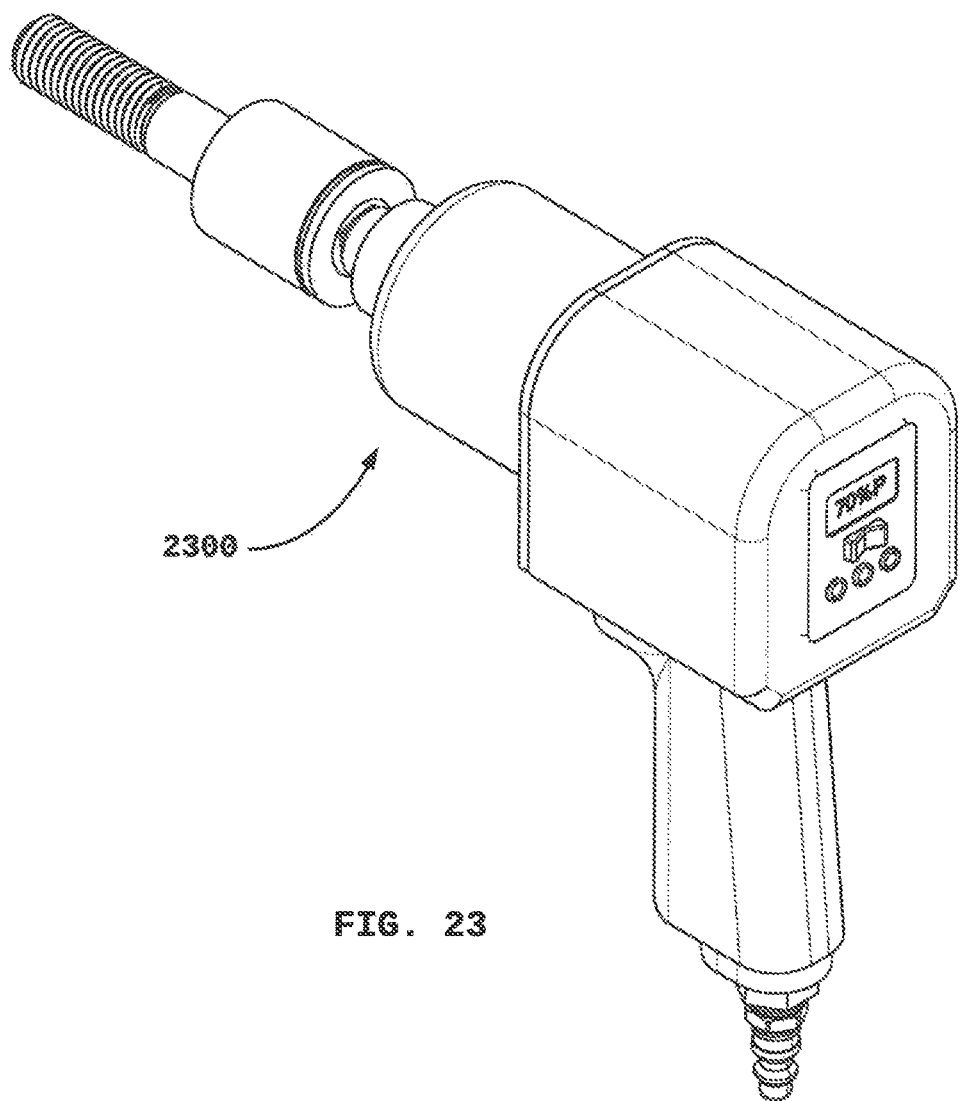
FIG. 23 is an isometric view of a power wrench according to an exemplary embodiment of the invention.
Figure 24:
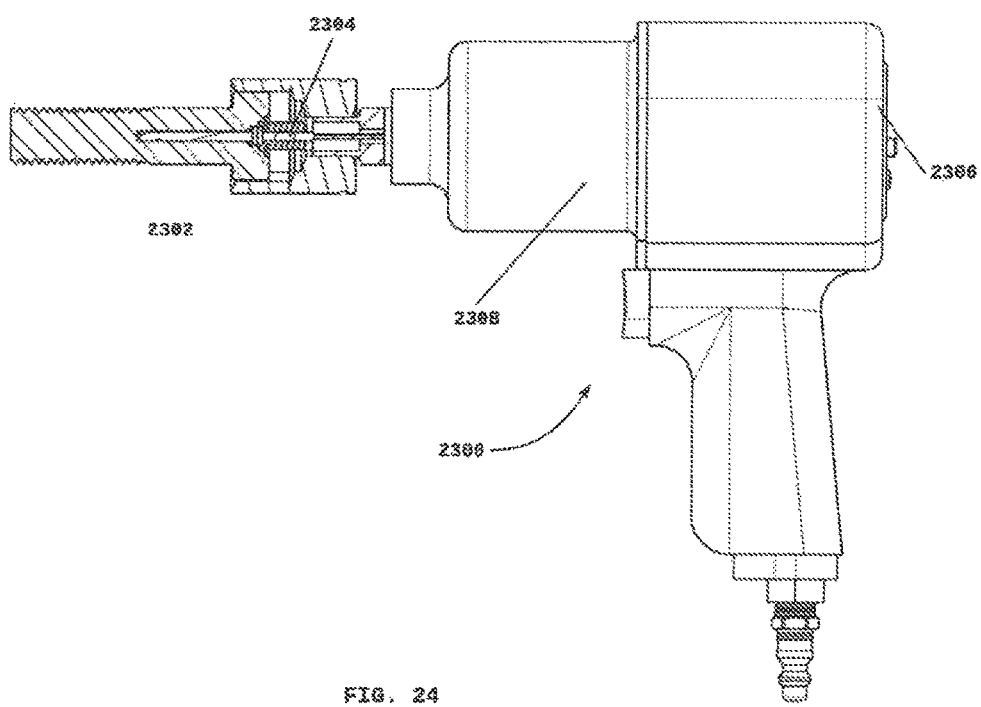
FIG. 24 is a cross-sectional view of the embodiment shown in FIG. 23.

The control system architecture in general is presented as both displacement as well as more specifically in an embodiment of smart fasteners and tension control. Two preferred embodiments illustrating the entire system will now be described in connection with FIGS. 21-24. FIGS. 21-22 illustrate a manual wrench system 2100, that comprises chromaulic sensor 2102, fiber optic probe 2104, electronic system 2106, and "bio" electromechanical system 2108 since the operator would be applying the force according to the electromechanical systems output instructions. FIGS. 23-24 illustrate a handheld pneumatically driven impact gun or torque driver system 2300. The system 2300 comprises chromaulic sensor 2302, fiber optic probe 2304, electronic system 2306, and electromechanical control system 2308. With system 2300, a desired tension is advantageously set by the user, then the system controls the driver until the desired tension, as measured by the chromaulic sensor 2302, and read by the fiber optic probe 2304, is reached. It should be understood that systems according to embodiments of the invention can be internal or external to the mechanical device and utilized in entirety or only select subsystems. The basis for the closed loop control systems as described is the chromaulic transducer that enables the generalized system to have the information necessary in order to control its output. The controlled output minimizes error of the system and provides true control and accuracy. Embodiments of the invention preferably have some form of human machine interface and varying forms of autonomy. A human operator can be expected to provide information to the system with which it is then able to control displacement either autonomously or with controlled interaction with the human.

What is claimed is:

1. A displacement transducer comprising:
   a main body having a proximal end and a distal end, the main body having an opening extending into the body from the proximal end;
   a gage pin fixedly attached to a distal end of the opening, wherein the gage pin comprises an indicator slab having a substantially flat surface facing the transparent datum window, the indicator slab being porous;
   a transparent datum window covering the opening, the transparent datum window having a proximal side and a distal side;
   at least one fluid channel extending from said opening to a proximal side of said transparent window; and
   an indicator fluid filling said opening, and filling a space between said gage pin and said transparent window.

2. The displacement transducer of claim 1, wherein said gage pin separated from said transparent datum window according to an amount of strain on said main body.

3. The displacement transducer of claim 1, further comprising a sealing layer sealing the opening and the fluid channels on a proximal side of said transparent datum window.

4. The displacement transducer of claim 1, wherein there are at least two fluid channels extending from said opening to a proximal side of said transparent datum window.

5. The displacement transducer of claim 1, wherein the gage pin comprises an indicator slab having a substantially flat surface facing the transparent datum window, the indicator slab having at least one port extending through the indicator slab.

6. The displacement transducer of claim 1, wherein said space is at least partially filled with an elastomeric foam.

7. The displacement transducer of claim 6, wherein the elastomeric foam comprises closed cell foam.

8. The displacement transducer of claim 1, wherein said space is at least partially filled with a confined gaseous atmosphere.

9. The displacement transducer of claim 1, further comprising a locating feature on a proximal end of said main body for locating a fiber optic probe relative to the transducer.

10. The displacement transducer of claim 9, wherein the locating feature comprises at least one locating pin extending proximally from the main body.

11. The displacement transducer of claim 9, wherein the locating feature comprises a tapered surface on the distal end of the main body.

12. The displacement transducer of claim 3, further comprising a data shield oriented between the sealing layer and the transparent datum window.

13. The displacement transducer of claim 1, wherein the main body comprises a threaded fastener, and wherein said transparent datum window is visible on a head of the fastener.

14. The displacement transducer of claim 1, further comprising an RFID chip embedded into the main body.

15. A method of manufacturing a displacement transducer comprising the steps of:
    forming a main body having a recess therein;
    placing a gage pin within the recess, wherein the gage pin comprises an indicator slab having a substantially flat surface facing the transparent datum window, the indicator slab being porous;
    placing a transparent datum window over the gage pin and within the recess;
    filling said recess with an indicator fluid using at least one fluid channel formed in the main body;
    applying a sealant over the transparent datum window and recess; and
    curing the sealant.

16. The method of claim 15, further comprising the steps of:
    dispensing a retaining compound into the recess; and
    curing the retaining compound to fix the gage pin within the recess.

17. The method of claim 16, further comprising the step of inserting an elastic device into the recess prior to curing the retaining compound.

18. The method of claim 17, wherein the elastic device comprises a closed cell foam.

19. The method of claim 15 further comprising the step of placing a data shield over the transparent window prior to applying the sealant.

20. The method of claim 19, further comprising the step of etching data onto the data shield.

21. A displacement transducer system comprising:
    a main body having a proximal end and a distal end, the main body having an opening extending into the body from the proximal end;
    a gage pin fixedly attached to a distal end of the opening;
    a transparent datum window covering the opening, the transparent datum window having a proximal side and a distal side;
    at least one fluid channel extending from said opening to a proximal side of said transparent window;
    an indicator fluid filling said opening, and filling a space between said gage pin and said transparent window;
    a first locating feature on a proximal end of said main body for locating a fiber optic probe relative to the transducer;
    a fiber optic probe comprising a second locating feature adapted to interface with the first locating feature to orient an optical fiber relative to the transparent datum window;
    the fiber optic probe comprising an electromagnetic energy transmitter for transmitting electromagnetic energy into a transmitting fiber of said optical fiber, and an electromagnetic energy receiver for receiving electromagnetic energy received from the indicator fluid via a receiving fiber of the optical fiber; and further comprising electronics adapted to analyze the received electromagnetic energy and to determine a displacement based on the received electromagnetic energy; and a memory adapted to receive a displacement value, and wherein the fiber optic probe is adapted to control an electromechanical system to apply an amount of tension to the main body based on the received displacement value.

22. The displacement transducer system of claim 21, wherein the electromechanical system comprises a tension wrench; and wherein the system further comprises an LED adapted to indicate whether the tension applied to the main body is correct based on the received displacement value.

23. The displacement transducer system of claim 21, wherein the electromechanical system comprises a closed loop control system for automatically applying tension to the main body.

24. The displacement transducer system of claim 23, wherein the closed loop control system comprises a powered wrench.

25. The displacement transducer system of claim 21, wherein the fiber optic probe measures an attenuation between the transmitted energy and the received energy.

* * * * *